US012718477B2

(12) United States Patent
Liu et al.

(10) Patent No.: US 12,718,477 B2
(45) Date of Patent: Aug. 25, 2026

(54) DYNAMIC (4D) SCENE RECONSTRUCTION USING MULTIPLE NEURAL RADIANCE FIELDS

(71) Applicant: Mitsubishi Electric Research Laboratories, Inc., Cambridge, MA (US)

(72) Inventors: Xinhang Liu, Kowloon (HK); Moitreya Chatterjee, Somerville, MA (US); Suhas Lohit, Arlington, MA (US); Pedro Miraldo, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 125 days.

(21) Appl. No.: 18/619,486

(22) Filed: Mar. 28, 2024

(65) Prior Publication Data

US 2025/0308153 A1 Oct. 2, 2025

(51) Int. Cl.

| | |
|---|---|
| ***G06T 17/00*** | (2006.01) |
| ***G06T 7/20*** | (2017.01) |
| ***G06T 7/70*** | (2017.01) |
| ***G06V 10/56*** | (2022.01) |
| ***G06V 10/771*** | (2022.01) |

(52) U.S. Cl.
CPC ................ *G06T 17/00* (2013.01); *G06T 7/20* (2013.01); *G06T 7/70* (2017.01); *G06V 10/56* (2022.01); *G06V 10/771* (2022.01)

(58) Field of Classification Search
CPC .. G06T 17/00; G06T 7/70; G06T 7/20; G06V 10/56; G06V 10/771
USPC .......................................................... 345/419
See application file for complete search history.

(56) References Cited

U.S. PATENT DOCUMENTS

| | | | | |
|---|---|---|---|---|
| 11,748,940 | B1 * | 9/2023 | Xian | G06T 15/205 345/419 |
| 2023/0154104 | A1 * | 5/2023 | Zhuang | G06V 10/774 345/427 |
| 2024/0127573 | A1 * | 4/2024 | Park | G06T 15/20 |
| 2025/0166311 | A1 * | 5/2025 | Montero, Jr. | H04N 13/354 |

* cited by examiner

*Primary Examiner* — Hai Tao Sun
(74) *Attorney, Agent, or Firm* — Gene Vinokur

(57) ABSTRACT

Systems, methods, and software are disclosed herein that improve computer vision technology in general, and 4D scene reconstruction in particular. An artificial intelligence (AI) image processing system employs multiple dynamic neural radiance fields (NeRFs) to render two-dimensional (2D) images of a four-dimensional (4D) scene from different viewpoints and different instances of time. The AI image processing system collects viewing parameters for rendering a two-dimensional (2D) image of the 4D scene, such as from a desired viewing direction and at a desired instance of time. The system then executes the multiple dynamic NeRFs to obtain, based on the viewing parameters, color and volume density values for voxels associated with pixels in the 2D image. The system then renders the 2D image based on a combination of the color and the volume density values obtained from the multiple dynamic NeRFs.

20 Claims, 16 Drawing Sheets

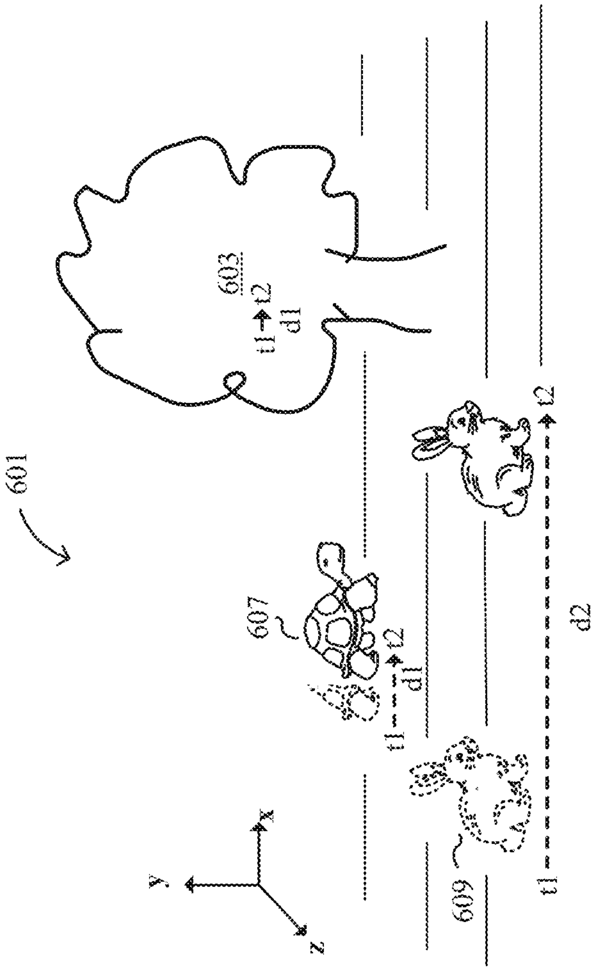
FIGURE 6B

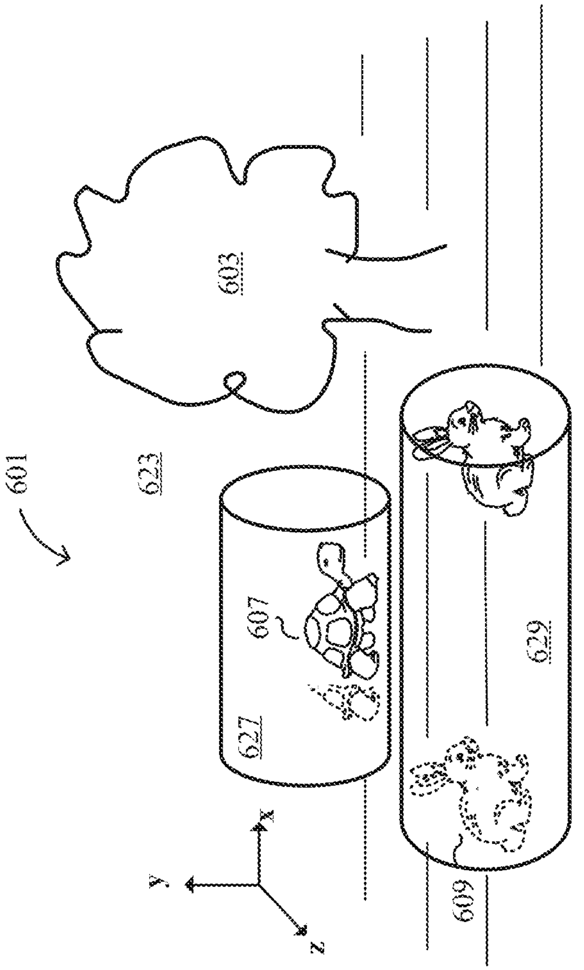
FIGURE 6C

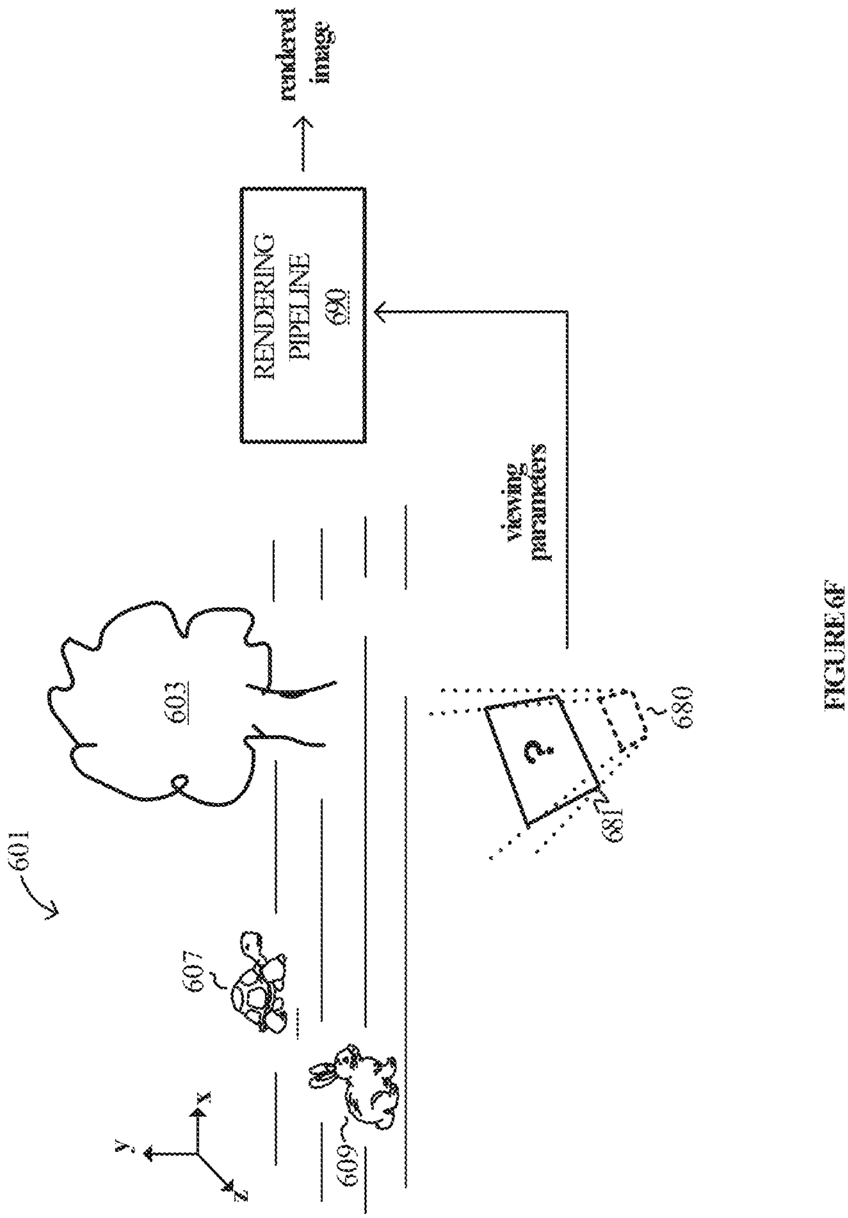
FIGURE 6F

600G 600H
691
601
603
607
609
697
692
693
694
695
time
view
viewing parameters
VISION PIPELINE 690
699

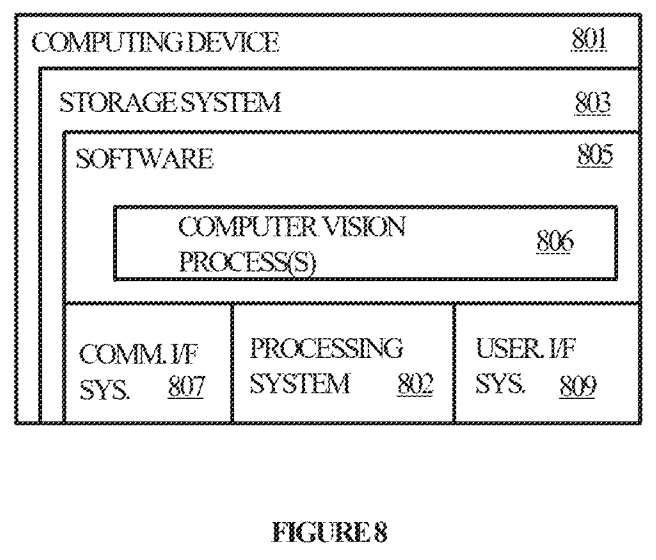

COMPUTING DEVICE 801

STORAGE SYSTEM 803

SOFTWARE 805

COMPUTER VISION PROCESS(S) 806

COMM. I/F SYS. 807

PROCESSING SYSTEM 802

USER I/F SYS. 809

FIGURE 8

DYNAMIC (4D) SCENE RECONSTRUCTION USING MULTIPLE NEURAL RADIANCE FIELDS

TECHNICAL FIELD

Aspects of the disclosure are related to the field of computer vision technology, and in particular, to the rendering of views of dynamic scenes using neural networks.

BACKGROUND

A neural radiance field—or NeRF—is a type of neural network trained on a sparse set of two-dimensional (2D) images of a three-dimensional (3D) scene to provide novel views of the 3D scene. NeRFs represent a 3D scene as a continuous function that maps 3D coordinates to color and density values. The core idea of these approaches is to represent a scene's 3D geometry and appearance implicitly through a deep neural network, which learns a mapping of a point in 3D space and the direction of viewing to color and density values.

Training a NeRF generally involves projecting a ray from an image pixel into a scene, and inputting 3D coordinates of voxels along the ray into a neural network. The network outputs corresponding color and density values for each voxel. The color and density values of the voxels along the ray are used to calculate a predicted color and density of the image pixel. A loss function evaluates the predicted values against the known values for the image pixel and updates parameters of the network accordingly.

Once trained, a NeRF may be integrated into a rendering pipeline to predict the color and density values of voxels along a ray projected from a pixel in a desired view for a scene. The predicted color and density values are processed to determine the color and density values for the pixel. The same steps are performed for all of the pixels in the desired view to produce a synthesized image. Ideally, a NeRF would be trained on every point in the scene. However, if each possible pixel and each possible voxel for that pixel were sampled, such high-resolution sampling would result in too many ground truth values needed for the training.

Recently, some works have extended such NeRF-based approaches to 4D scenes where the objects in the 3D scene may be changing in configuration, position, etc. However, existing approaches have failed to consider the question of the efficacy of the spatio-temporal sampling steps involved in the rendering process, of such scenes, which impedes the quality of their rendering and makes them less efficient.

SUMMARY

Systems, methods, and software are disclosed herein that improve computer vision technology in general, and 4D scene reconstruction in particular. In various embodiments, an artificial intelligence (AI) image processing system employs multiple dynamic neural radiance fields (NeRFs) to render two-dimensional (2D) images of a four-dimensional (4D) scene from different viewpoints at different instances of time. The NeRFs represent 4D scene implicitly, and the 4D itself is a 3D scene that changes over time.

The AI image processing system collects viewing parameters for rendering a two-dimensional (2D) image of the 4D scene, such as from a desired viewing direction and at a desired instance of time. The system then executes the multiple dynamic NeRFs to obtain, based on the viewing parameters, color and volume density values for voxels associated with pixels in the 2D image. The system then renders the 2D image based on a combination of the color and the volume density values obtained from the multiple dynamic NeRFs.

In some implementations, the dynamic NeRFs may be trained on the 4D scene at different spatio-temporal sampling resolutions with respect to each other. In addition, or in the alternative, training the NeRFs at the different spatio-temporal resolutions may be accomplished by leveraging semantic information about the 4D scene. The semantic information may be utilized to segment the 4D scene into regions—e.g., based on the relative motion intensities of the regions-which may then be assigned to specific ones of the NeRFs. For example, one NeRF may be trained at one spatio-temporal sampling resolution on one region (or regions) with less motion relative to another region or regions. A second NeRF may then be trained at a different (e.g., higher) spatio-temporal sampling resolution on the other region (or regions) of the 4D scene. In addition, or in the alternative, one or more of the NeRFs may also be trained on semantic embeddings of the 4D scene, thereby providing for nearly cost-free object tracking through the 4D scene.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 6A-6H illustrate an operational scenario with respect to training and rendering modes in an implementation.

FIG. 8 illustrates a computing system suitable for implementing the various operational environments, architectures, processes, scenarios, sequences, and frameworks discussed below with respect to the other Figures.

DETAILED DESCRIPTION

Figure 1:
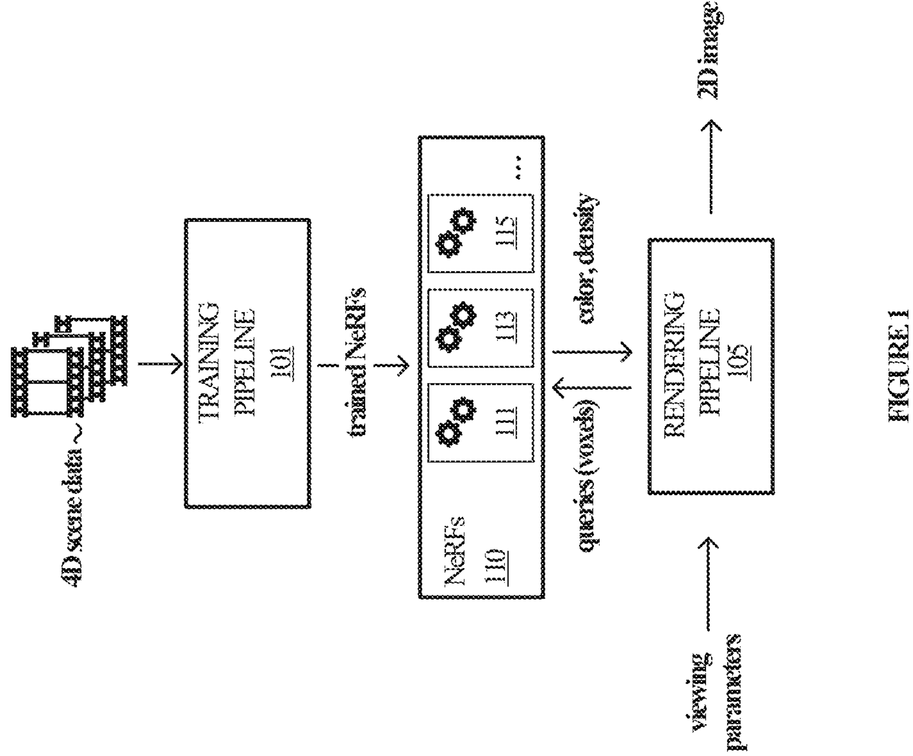
FIG. 1 illustrates a computer vision system's architecture in an implementation.

Reconstructing 3D scenes has a broad range of applications, including Virtual Reality/Augmented Reality (VR/

AR), 3D animation, game production, and film creation which allow users to observe scenes from any desired viewpoint. While it is crucial to reconstruct static 3D scenes, towards which significant progress has been made, it is even more crucial to reconstruct dynamic 3D scenes—or 4D, as referred to herein—as the world around us is often characterized by a constant state of flux, with many objects in it, in a state of motion.

To that end, an improved artificial intelligence (AI) image processing system is disclosed herein that enhances dynamic novel view synthesis by way of smarter spatio-temporal sampling that, in some implementations, allows for improved tracking of objects of interest in novel views. A new concept of gears allows for the stratified modeling of dynamic regions of 3D scenes based on the extent of their motion. Such differentiation allows the spatio-temporal sampling resolution for each region to be adjusted in proportion to its motion scale, achieving more photo-realistic, dynamic novel view synthesis. In some implementations, the new approach enables viewpoint tracking of objects of interest at very low additional computational cost.

In particular, the image processing system employs multiple dynamic NeRFs to render 2D images of a 4D scene from different viewpoints and different instances of time. The NeRFs are collectively aware of the distinction between static and dynamic regions in a scene (and/or between less dynamic and more dynamic regions in a scene). As such, the NeRFs can represent the relatively more dynamic regions more faithfully than otherwise, which inherently requires more resources per unit than less dynamic regions, due to their time-evolving nature. Regions can be further stratified according to their motion scale and allocated samples accordingly.

In some implementations, the disclosed AI image processing system follows a framework that leverages semantic embedding from image segmentation models for stratified modeling of 4D scenes. The system optimizes for a 4D semantic embedding, based on which the system determines the appropriate region-specific resolution of spatio-temporal sampling in the NeRFs. Regions with larger motion scales are assigned higher spatio-temporal sampling resolutions, which are applied differentially to the NeRFs. The NeRFs may be trained on regions that differ relative to each other in their entirety, in part, or both. Generally speaking, each NeRF is trained based on a combination of region and spatio-temporal sampling resolution that differs relative to the region and resolution combination(s) of the other NeRF(s).

Various technical effects may be realized and appreciated with respect to this motion-aware sampling strategy, including improvements in the quality of synthesized images. In addition—or in the alternative—viewpoint object tracking may also be supported and is made possible by semantically embedded representations. Empirical studies validated the effectiveness of the disclosed techniques where state-of-the-art rendering and tracking performance on multiple challenging datasets was achieved.

Turning now to the drawings, FIG. 1 illustrates computing vision system's architecture in an implementation, represented by system architecture 100. System architecture 100 includes training pipeline 101, rendering pipeline 105, and NeRFs 110 (including NeRF 111, NeRF 113, and NeRF 115). Training pipeline 101 is representative of a computing hardware, software, and/or firmware system that takes 4D video data as input and trains artificial neural networks on the data (e.g., NeRFs 110). Rendering pipeline 105 is representative of computing hardware, software, and/or firmware that takes viewing parameters as input, interfaces with neural networks to obtain voxel color and density values (e.g., NeRFs 110), and produces 2D images as output.

It may be appreciated that, while illustrated together, practical applications of system architecture 100 may implement training pipeline 101 and rendering pipeline 105 separately from each other. For example, training pipeline 101 may be implemented on computing equipment configured for training artificial neural networks, while rendering pipeline 105 may be implemented on different computing equipment. However, in some cases training pipeline 101 may be implemented on the same computing device(s) as rendering pipeline 105. For example, rendering pipeline 105 may be deployed to a runtime environment such as a personal computer, a mobile phone, an embedding computing system, a server computer, or the like, along with training pipeline 101, in a co-located and/or cooperative computing fashion.

Figure 2:
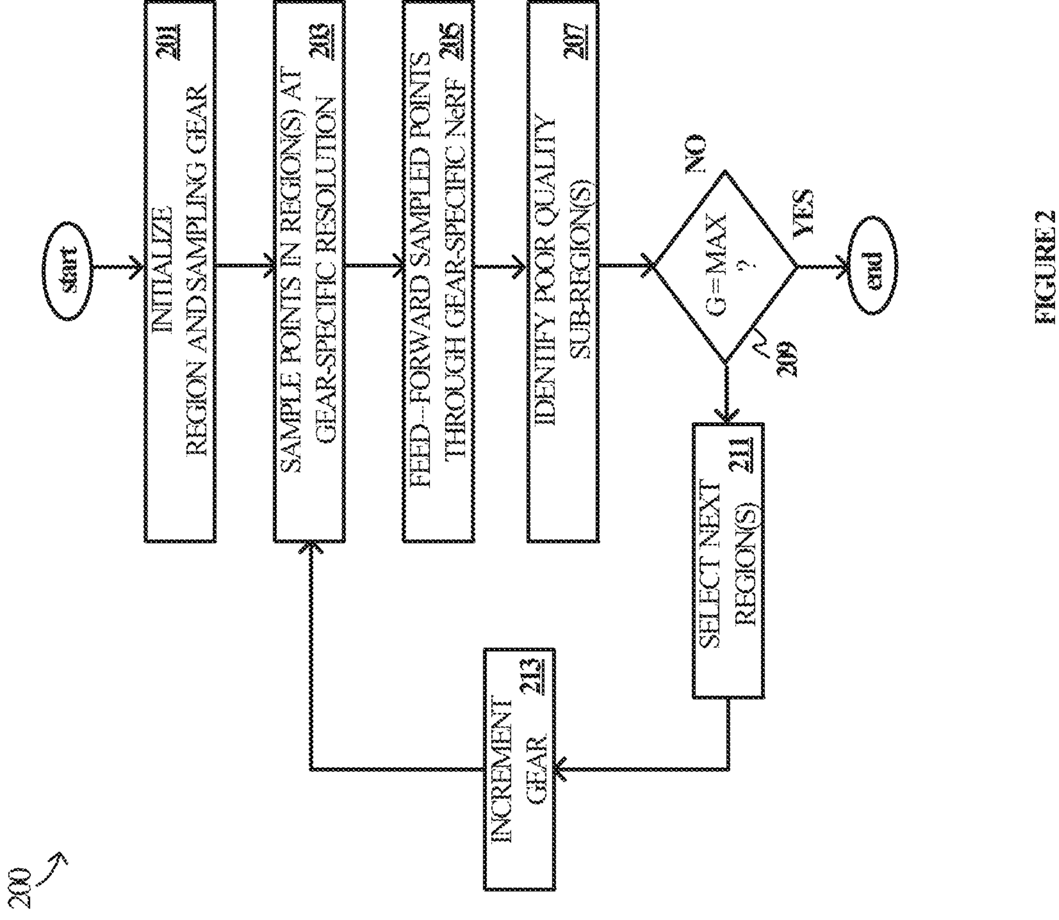
FIG. 2 illustrates a training process in an implementation.

FIG. 2 briefly illustrates a training process 200 employed using training pipeline 101 in the context of training multiple NeRFs. Training process 200 may be implemented in program instructions in the context of the software and/or firmware elements of training pipeline 101. The program instructions, when executed by one or more processing devices of one or more computing systems (e.g., computing device 801 in FIG. 8), direct the one or more computing systems to operate as follows, referring parenthetically to the steps in FIG. 2, and in the singular to a computing device for the sake of clarity.

In operation, the computing device initializes the region being sampled and the sampling level or "gear" at which to sample the region (step 201). The sampling gear represents a stage, level, or some other indicator that delineates one spatio-temporal sampling resolution from another. The region to be sampled is comprised of 4D space-time coordinates that can be conceptualized as relating to which pixels in the 2D video frames provide the ground truth values for training. At the outset, the 4D region may relate to all pixels in all frames, whereas further on in the training, the region(s) being sampled become more focused on points in the 4D scene related to pixels having greater motion intensity (see more below with respect to step 207). The four dimensions of the 4D scene include x, y, and z dimensions, as well as time (t).

The computing device proceeds to sample points in the current region of the 4D scene at the spatio-temporal sampling resolution corresponding to the current gear (step 203). The spatio-temporal sampling resolution includes two components: a spatial component that defines the granularity of sampled points in terms of their x-y-z locations in the 4D scene; and a temporal component that identifies the granularity of sample points in terms of video frames, or t.

Taking a single pixel as an example, the pixel is represented in multiple successive frames of video captured by a camera from a specific viewing direction. 4D points in the scene that correspond to the pixel are those that fall along a ray projected from the pixel at multiple instances of time. The temporal component of the spatio-temporal sampling resolution relates to the time component of each 4D point associated with the pixel, while the spatial component relates to the x-y-z components of each 4D point associated with the pixel.

The spatial component may be better understood by keeping the temporal component constant and limited to a single instance of time. At full spatial resolution at a single instance of time, all 3D points along a ray projected from a given pixel at the single instance of time would be sampled;

at half resolution, half the 3D points would be sampled; at a quarter resolution, one quarter of the points would be sampled; and so on for other spatial sampling resolutions.

The temporal component may similarly be better understood by keeping the spatial component constant. As discussed above, a spatial component of ½ would cause half the 3D points along a ray projected from a pixel at a given instant of time to be sampled. However, assuming full temporal resolution, the same 3D points would be sampled for every possible instance of time, meaning for every frame of the captured video. Reducing the temporal resolution by half would cause the set of 3D points to be sampled across only half of the frames; reducing the temporal resolution by another half (to one quarter) would cause the set of 3D points to be sampled across only one quarter of the frames; and so on for other temporal sampling resolutions.

Combining the two concepts further illustrates the technique. A spatial sampling resolution of ½ and a temporal sampling resolution of ½ for a given pixel would cause half the 3D points along a ray projected from the pixel to be sampled in half the video frames (presumably at evenly spaced intervals with respect to both spatial and temporal resolutions, although such a presumption is not required). A spatial sampling resolution of ¼ and a temporal sampling resolution of ¼ for a given pixel would cause one quarter of the 3D points along a ray projected from the pixel to be sampled in one quarter of the video frames (again assuming the same evenly spaced intervals, although they are not required).

The sampled points are fed forward through one of the corresponding NeRFs (step 205). The input to the NeRF for each point is a vector representation of the 4D coordinates for the point, along with a viewing direction. Each feature vector is an m-dimensional feature vector for every point in the 4D scene being sampled at the current spatio-temporal sampling resolution. The m-dimensions of the feature vector allow each combination of x, y, z, and i coordinates to be uniquely encoded or embedded in the values that make up the feature vector. For each sampled 4D point, the input to the NeRF includes the point's feature vector and a viewing direction d.

The output produced by the NeRF includes a predicted color value (c) and a predicted volume density level (r) for each input combination of feature vectors and viewing directions. The output of the NeRF also includes a semantic embedding(s) for each input combination. Predicted pixel values are computed based on the predicted color and volume density levels for the points (or voxels) associated with a given pixel. For instance, for a pixel in a frame at time t, the color of the pixel is computed based on the color and volume density values output by the NeRF for 3D points at time t along a ray projected through the pixel into the scene. The computing device also computes the semantic feature for a given pixel in a manner analogous to how it computes pixel values.

A loss function compares the predicted outputs to ground-truth values and updates parameters of the NeRF accordingly. The predicted pixel values are compared to ground-truth pixel values in the 2D frames of the captured video data, while the predicted semantic features are compared to ground-truth 2D semantic feature maps corresponding to each 2D frame. The training of the first NeRF eventually stops or is otherwise paused, at which time the computing device examines one or more images generated based on the NeRF's output to identify sub-regions of poor quality in the sampled region of the 4D scene (step 207).

Examining the quality of the NeRF is accomplished by using the NeRF to generate 2D images from multiple viewpoints (or viewing directions) at multiple time steps and comparing them to ground truth 2D images of the video frames. In addition, corresponding feature maps are produced for the 2D images which are compared to ground truth 2D feature maps. The differences between the predicted red-green-blue (RGB) values in the predicted 2D images and the ground truth images factors into the quality evaluation, as do the differences between the predicted semantic features and the ground truth semantic features.

The computing device computes a 2D rendering loss map based on the RGB and semantic differences, which is then analyzed to find center coordinates of patches of poor quality. Along with the ground truth 2D images, the center coordinates are fed into a segmentation decoder to generate 2D upshift masks. The upshift masks generally correspond to sub-regions in the current region that are of poor quality, i.e. not satisfactorily rendered using the current spatio-temporal sampling resolution. It may be appreciated that multiple upshift masks result, each at a different viewpoint and time.

The computing device then proceeds to determine whether the process has reached the last gear or not (step 209). If the last gear has been reached, then the process ends. Otherwise, the computing device proceeds to select the next region(s) for sampling (step 211). The upshift masks generated above are used to define the next region(s). That is, as the upshift masks are 2D, they are used to filter the pixels in each corresponding frame used as the ground truth for the next round of training. In the aggregate, the 2D upshift masks across multiple instances of time cause 4D motion regions to be formed during sampling.

Take for example the motion of an object in a 3D scene captured from multiple directions by multiple cameras. Each camera records multiple frames across multiple instances of time, with the pixels of each frame forming a 2D image. Assume for exemplary purposes that a first round of training of a first NeRF at a first spatio-tempo sampling resolution resulted in poor RGB and semantic feature quality corresponding to the object. The poor quality would result in the creation of upshift masks from the viewpoints supplied by at least some of the cameras and across many frames. The upshift masks would then be applied to the 2D images at the next gear to determine which pixels to train on.

As discussed above, sampling 4D pixels involves projecting rays from training pixels and sampling 3D points along the rays passing through those pixels and at different timestamps. Applying an upshift mask to a given training image eliminates some of the pixels from the training set, leaving behind only those related to the object in this example. Considering a succession of frames to further illustrate the point, the object in each successive frame would occupy a different set of pixels relative to the prior frame. However, assuming low-quality rendering for exemplary purposes, upshift masks would have also been created for viewpoints and time instances corresponding to those frames. In the aggregate, the upshift masks functions to define a focus region that can be sampled at a higher spatio-temporal resolution than the prior region.

Having identified the next region or regions to be sampled, the computing device increments the gear level (step 213) and returns to step 203. At step 203, the computing device samples 4D points associated with the new region (or regions) at the next spatio-temporal sampling resolution associated with the next NeRF. The next spatio-temporal sampling resolution may be higher than the previous resolution with respect to both the spatial and temporal component, although the increases need not be proportional to each other. In addition, or in the alternative, the boundaries of the next region(s) to be sampled may be smaller than the region(s) before. For example, whereas the boundaries of the initial region may have encompassed the entire 4D scene, successive regions may be bounded to small portions of the 4D scene. Training process 200 continues until no further gears remain, at which time the collection of NeRFs may be deployed to a runtime environment where rendering process 300 leverages their motion-aware characteristics to construct novel views of the 4D scene.

Figure 3:
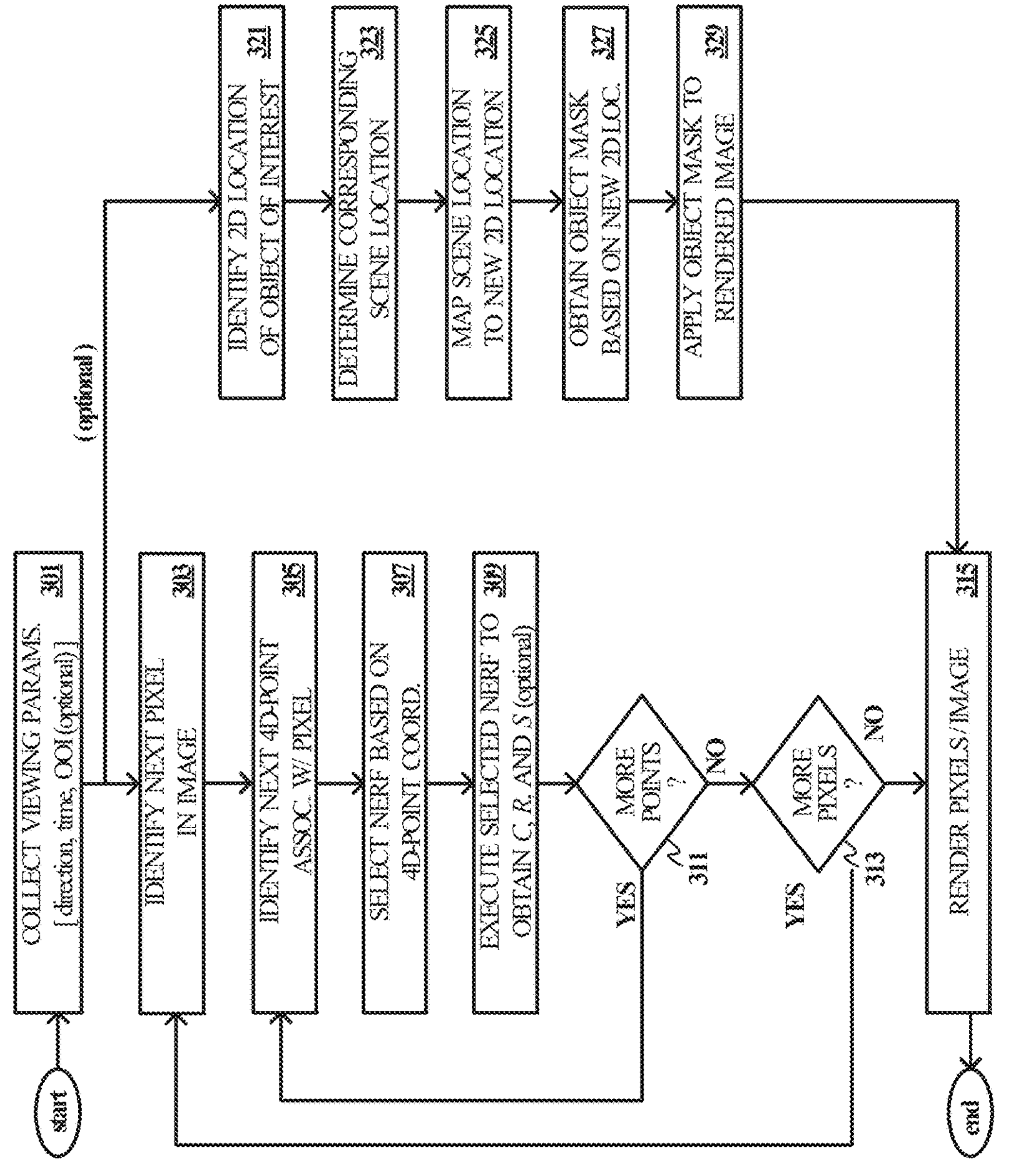
FIG. 3 illustrates a rendering process in an implementation.

FIG. 3 briefly illustrates rendering 300 employed using rendering pipeline 105 in an implementation. Rendering process 300 may be implemented in program instructions in the context of the software and/or firmware elements of rendering pipeline 105. The program instructions, when executed by one or more processing devices of one or more computing systems (e.g., computing device 801 in FIG. 8), direct the one or more computing systems to operate as follows, referring parenthetically to the steps in FIG. 3, and in the singular to a computing device for the sake of clarity.

In operation, the computing device collects viewing parameters including a desired viewpoint (or direction, defined in terms of an azimuth angle and an angle of inclination) and a desired instance of time (step 301) with which to render a novel view of a 4D scene. Optionally, the viewing parameters may also include an object of interest. In such cases, the object of interest may be indicated by a user via a selection of the object in a user interface, such as by clicking on the object in an initial 2D image of the scene.

The novel view is comprised of a grid of pixels that together form a 2D image. To render the 2D image, the computing device queries multiple NeRFs for the color and volume density of voxels associated with the pixels. The color and density values for each set of voxels associated with each pixel are used to compute the color (or radiance) and the density value of the voxels. The computing device proceeds iteratively through the 2D image on a per-pixel basis (although practical implementations may employ parallel processing). Accordingly, the computing device identifies the next pixel (step 303) and, for that pixel, identifies a next voxel in a set of voxels associated with the pixel (step 305).

For the identified voxel, the computing device selects one NeRF out of the collection of NeRFs to query for the voxel's color and volume density values (c, r) and, optionally, a semantic feature value(s) (step 307). The selection of the NeRF is based on the 4D coordinates of the voxel, which corresponds to a specific region in the 4D scene that the selected NeRF was trained on at a NeRF-specific spatio-temporal resolution. Selecting the NeRF may be accomplished by, for example, utilizing a functional mapping of regions to NeRFs to look-up the NeRF based on the voxel's 4D coordinates. The functional mapping may be implemented by a computed function, by a look-up table, or the like.

Upon identifying the appropriate NeRF, the computing device executes the selected NeRF to obtain c, r, and—optionally—s (step 309) for the current voxel. After obtaining these values for the voxel, the computing device determines whether any voxels remain in the voxel set associated with the pixel (step 311). If so, the computing device repeats steps 305-309 until no voxels remain for the current pixel. Once no voxel remains, the computing device ascertains whether any pixels remain to be computed in the target image (step 313). If so, the computing device repeats steps 303-311 until no more pixels remain, at which point the computing device may render the 2D image based on the color and density values obtained for each group of voxels associated with each pixel in the image.

In the optional scenario where the viewing parameters indicate an object of interest, rendering process 300 includes steps 321-329, which describe a sub-process that allows for object tracking through the 4D scene. At step 321, the computing device identifies a 2D location of the object of interest in an initial 2D image of the 4D scene. For example, a user may click on a point in the initial image, thereby defining the x-y coordinates of the selected point. Next, the computing device determines a corresponding 3D location of the object in the scene based on the object's 2D coordinates in the image (step 323). From there, the computing device maps the 3D scene location to an x-y location in the novel image being created (step 325).

At this point, the computing device is able to leverage the semantic feature values(s) output by the NeRFs for each voxel to obtain an object mask for the object of interest (step 327). In particular, the computing device generates a 2D feature map based on the feature values and submits the feature map, along with the x-y coordinates in the novel image to a semantic decoder. The semantic decoder generates an object mask based on the feature map and the center point represented by the x-y coordinates. The object mask may then be applied to the novel 2D image (step 329), which may occur before the 2D image has been rendered in step 315 or subsequent to the 2D having been rendered in step 315.

Figure 4A:
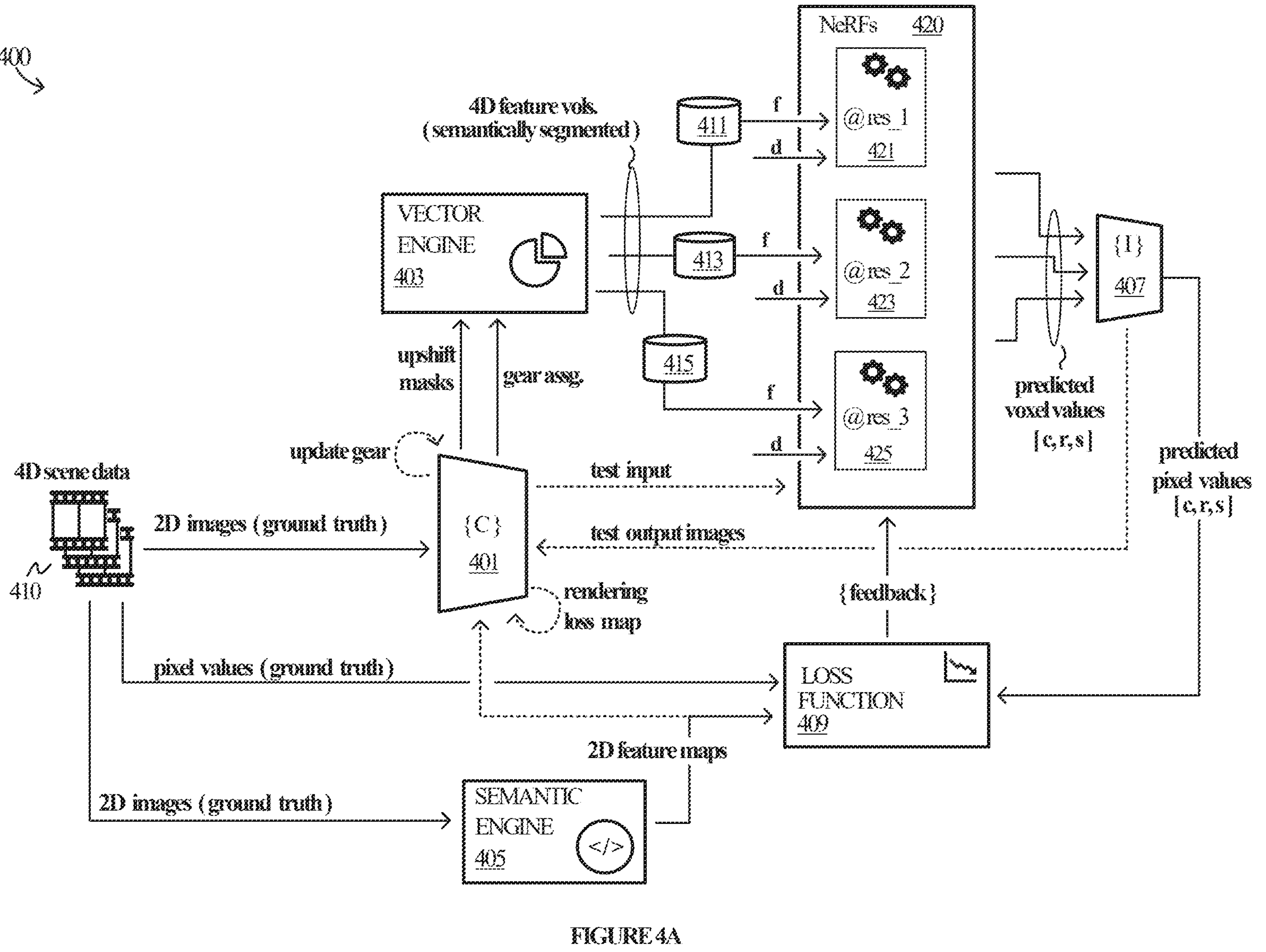
FIG. 4A illustrates a training pipeline in an implementation.
Figure 4B:
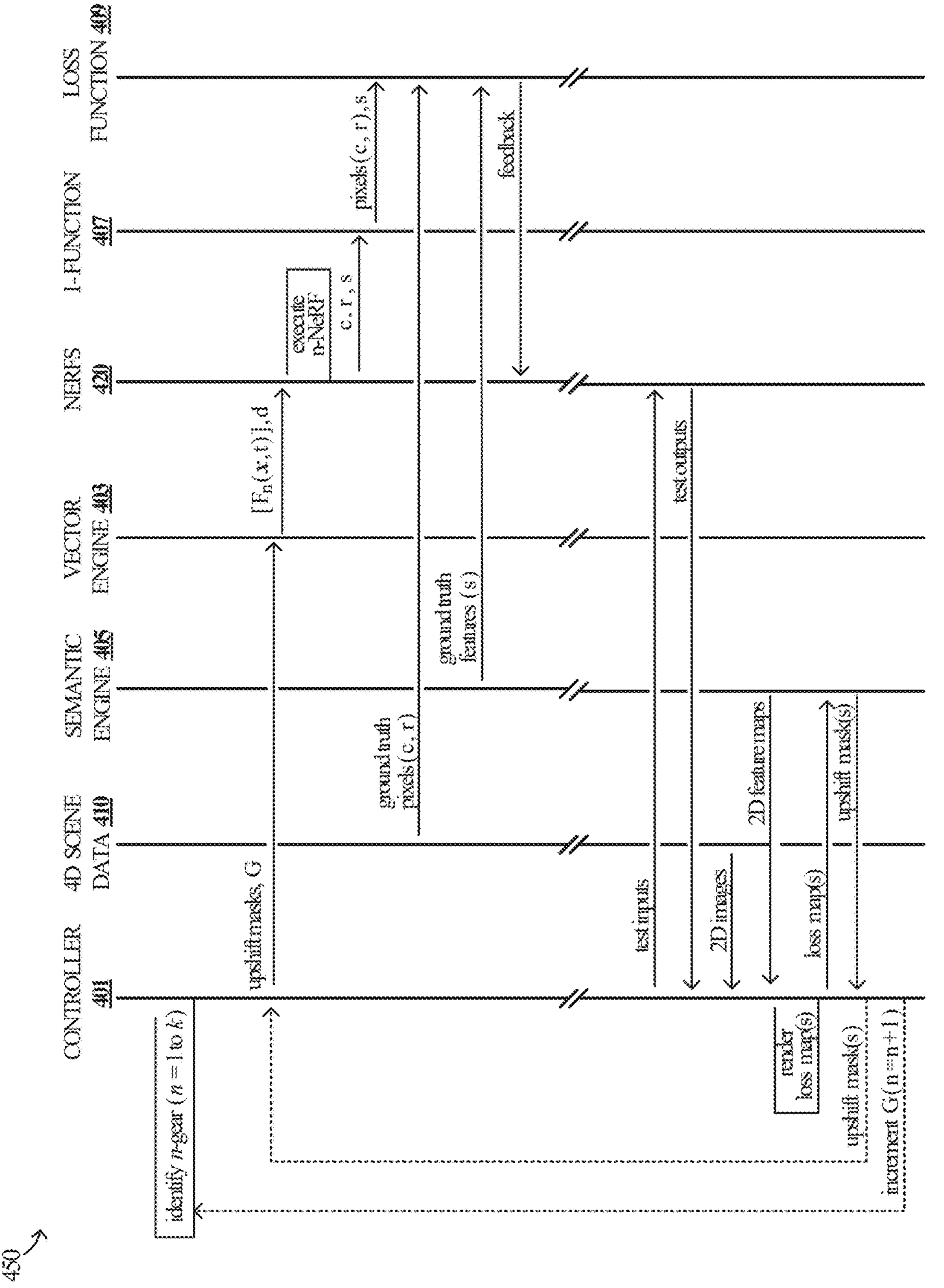
FIG. 4B illustrates an operational scenario with respect to training in an implementation.

FIG. 4A illustrates training pipeline 400 in an implementation, while FIG. 4B illustrates an operational scenario 450 with respect to training pipeline 400. Training pipeline 400 is representative of computing hardware, software, and/or firmware components capable of training multiple NeRFs on 4D scene data 410 at dynamic spatio-temporal sampling resolutions to generate novel views of the scene. Training pipeline 400 includes controller 401, vector engine 403, semantic engine 405, rendering function 407, loss function 409, and NeRFs 420. NeRFs 420 include NeRF 421, NeRF 423, and NeRF 425.

Generally speaking, controller 401 directs two processes that take place in an alternating fashion: 1) the process of radiance field optimization (training the NeRFs); and 2) gear assignment updating. The two processes are interrelated in that the gear assignments govern which NeRF is trained and on which feature volume. The information flow associated with radiance field optimization is illustrated by solid lines connecting the elements of training pipeline 400, while steps specific to gear assignment updating are illustrated by dashed lines.

With respect to the radiance field optimization process, controller 401 supplies vector engine 403 with upshift masks (or none, at the outset) and gear assignments. Vector engine 403 generates one feature volume per gear. For example, vector engine 403 generates feature volume 411 in the context of a first gear assignment, feature volume 413 in the context of a second gear assignment, and feature volume 415 in the context of a third gear assignment.

NeRFs 420 take feature vectors supplied by features volumes 411, 413, and 415 as input, as well as directional input. In addition, each NeRF is trained on a corresponding one of the feature volumes: NeRF 421 is trained on feature volume 411; NeRF 423 is trained on feature volume 413; and NeRF 425 is trained on feature volume 415. Thus, because each feature volume represents a different spatio-temporal sampling resolution, each one of NeRFs 420 is trained at a different spatio-temporal sampling resolution than each other one of NeRFs 420.

NeRFs 420 output color (c), volume density (r), and semantic features(s) for each input combination of feature vector (f) and direction (d). Rendering function 407 computes a pixel value based on the color and volume density values for voxels associated with the pixel. Rendering function 407 also computes a semantic feature for the pixel based on the semantic feature values output by NeRFs 420 for the associated voxels.

Loss function 409 evaluates the predicted pixel values against ground truth pixel values supplied in 4D scene data 410. Loss function 409 also evaluates the predicted semantic values against the ground truth semantic values supplied by semantic engine 405. Loss function 409 updates the parameters of NeRFs 420 based on the results of the comparison.

With respect to the gear assignment updating process, controller 401 determines the gear assignments based on ground truth 2D images in 4D scene data 410, 2D feature maps produced by semantic engine 405, and test output images produced by rendering function 407.

More specifically, upon pausing the radiance field optimization process, controller 401 supplies test input to NeRFs 420 in the form of test feature vectors and test directional input corresponding to multiple viewpoints at multiple times for which the ground truth is known from 4D scene data 410. NeRFs 420 produce test output that rendering function 407 processes to generate test output images and feature maps at the different viewpoints and different times.

Controller 401 generates a rendering loss map for each of the 2D test images and test feature maps based on a comparison of the test images and test feature maps to ground truth 2D images and ground truth feature maps. Those of the test images and test maps lacking in sufficient quality are used to produce upshift masks for the next gear (assuming a next gear is available). Controller supplies the new upshift masks to vector engine 403, along with an updated gear assignment, and restarts the radiance field optimization process.

The restarted radiance field optimization process, per the new upshift masks and gear assignment, progresses to train the next NeRF on the next feature volume. For example, if the initial round of radiance field optimization trained NeRF 421 on feature volume 411 (and thus, at a first spatio-temporal sampling resolution), the next round of radiance field optimization would train NeRF 423 on feature volume 413 (and thus, at a second spatio-temporal sampling resolution). Moreover, the new upshift masks, with which vector engine 403 generates the feature vectors for feature volume 413, serve to focus the sampling on a region of poor quality in the 4D scene, as ascertained earlier by controller 401.

Operational scenario 450 illustrates an operational sequence to better illustrate the radiance field optimization process discussed above, as well as the gear assignment update process. The top half of operational scenario 450 pertains to radiance field optimization, while the bottom half pertains to gear assignment updating.

In operation, controller 401 identifies a current gear n, where n is a gear number from 1 to k. Next, controller 401 determines which n-region(s) to sample. At the outset, the entire 4D scene may be subject to sampling, while later on, the region(s) may be based on the upshift masks computed during the gear assignment update process. Controller 401 passes the upshift masks, values derived from the upshift masks, or other such information to vector engine 403, to enable vector engine 403 to generate feature volumes at the specific spatio-temporal resolution tailored to the current gear. As such, controller 401 also identifies the current gear to vector engine 403. Vector engine 403 selects 4D points based on the upshift masks and the spatio-temporal sampling resolution and generates feature vectors corresponding to the selected 4D points. The feature vectors and direction are input to one of the selected NeRFs 420 corresponding to the current gear.

The selected NeRF processes each input to output predicted color, volume density, and semantic values for each 4D point and direction combination. Rendering function 407 computes predicted color, volume density, and semantic values for each pixel based on the values obtained for the pixel's voxels. Loss function 409 compares the predicted results to the ground truth pixel values and semantic feature values supplied in 4D scene data 410 and provided by semantic engine 405 respectively. Finally, loss function 409 updates the parameters of the selected NeRF based on the results of the comparison.

Proceeding next to the gear assignment update process, controller 401 submits input values to the currently designated NeRF being trained to test the ability of the NeRF to accurately reconstruct 2D images from known viewpoints and time stamps. The test input values include, for example, various 4D points and directional input associated with the pixels in the test images being constructed. Controller 401 uses the NeRF's output to construct not only predicted 2D images, but also predicted 2D feature maps. Controller 401 also obtains the ground truth images and feature maps from 4D scene data 410 and semantic engine 405 respectively.

Controller 401 generates rendering loss maps based on the differences between the predicted images and feature maps and the ground truth images and feature maps. Next, controller 401 submits the loss maps to semantic engine 405, which is able to generate upshift masks corresponding to poor quality region(s) in the loss maps. Controller 401 leverages the upshift masks during the next round of radiance field optimization, which proceeds next with respect in the context of the next gear assignment and continues accordingly until no more gears are available and all the NeRFs have been trained.

Figure 5:
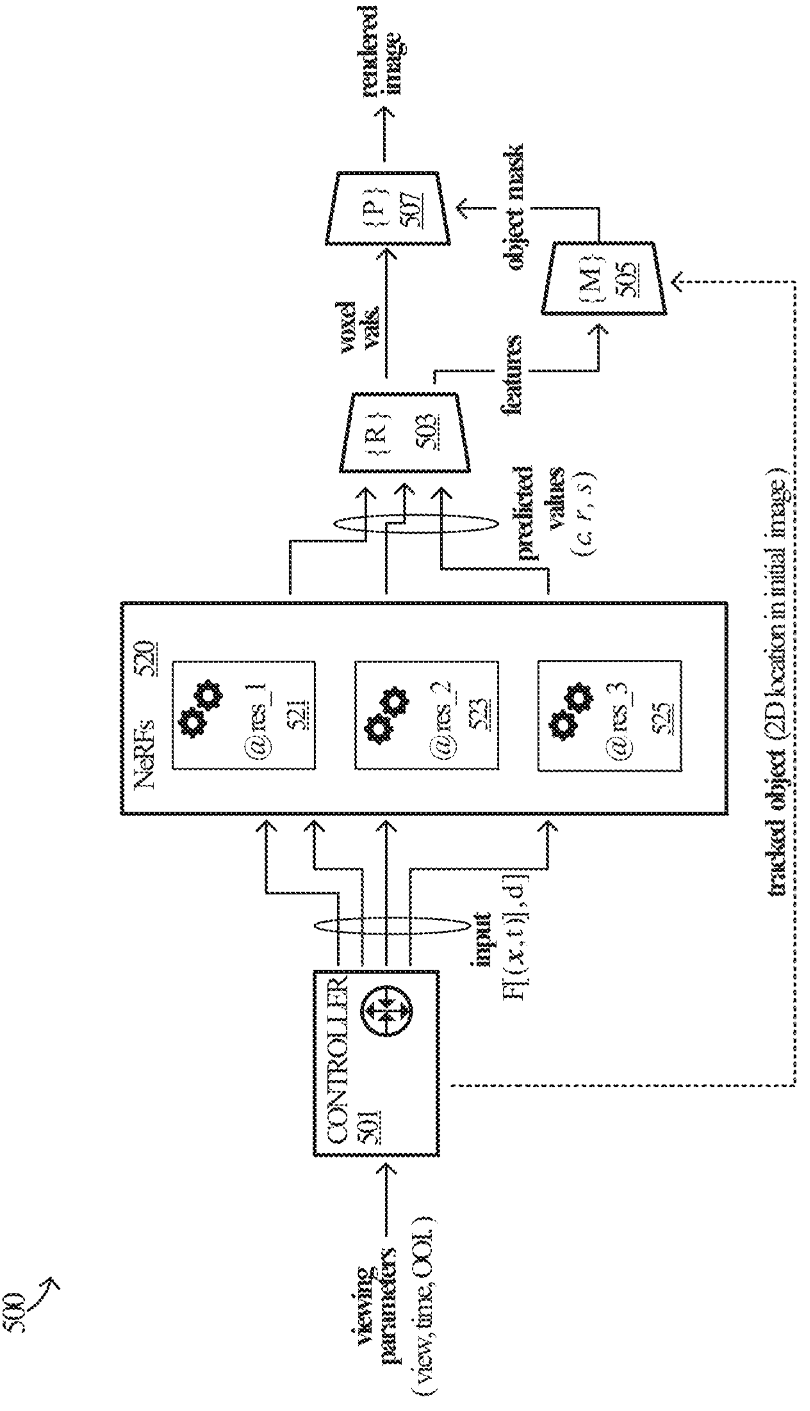
FIG. 5 a rendering pipeline in an implementation.

The trained NeRFs may be deployed in the context of a rendering pipeline, of which FIG. 5 provides an example. Rendering pipeline 500 is representative of computing hardware, software, and/or firmware components capable of constructing novel 2D images for desired viewpoints and at desired times. Rendering pipeline 500 includes controller 401, NeRFs 520, routing function 503, masking function 505 (optional), and pixel function 507. NeRFs 520 include NeRF 521, NeRF 523, and NeRF 525, which are representative of neural radiance fields trained at different spatio-temporal sampling resolutions with respect to each other and as discussed above.

In operation, controller 501 receives viewing parameters as input. The viewing parameters include a desired viewpoint (direction), a desired time, and the 2D location of an object of interest in a current viewing frame. Controller 501 queries NeRFs 520 to obtain color, volume density, and semantic feature value predictions for voxels associated with pixels in the 2D image being constructed. (It may be appreciated that the object tracking aspects of rendering pipeline 500 are non-limiting, optional features of the pipeline.)

More specifically for each pixel, controller 501 identifies a group of voxels in 4D space-time corresponding to the pixel. Controller 501 then computes a feature vector for each voxel based on the voxel's 4D coordinates and time stamp.

For each voxel, controller 501 selects one of the associated NeRFs 520 and supplies the computed feature vector and a directional component as input to the selected NeRF. The selected NeRF outputs color, volume density, and semantic feature values for the voxel.

The association between NeRFs and voxels may be predefined or predetermined by a mapping of 4D space-time coordinates to NeRFs. That is, which region or regions on which each NeRF was trained may be persisted or otherwise defined in a mapping function, a mapping table, or some other suitable function or data structure. Maintaining the association and persisting it to the rendering runtime environment allows the most appropriate and capable NeRF to be queried on a per-voxel basis, thereby improving the accuracy of the 2D image rendering.

In the aggregate, controller pushes through feature vectors and directional input for each voxel associated with a pixel, and for each pixel in the 2D image being constructed. The predicted color, volume density, and feature value outputs by NeRFs 520 are distributed by routing function 503 to either pixel function 507 or masking function 505.

Pixel function 507 accepts color and volume density values from routing function 503, which it uses to compute color and density values for the pixels. Masking function 505 accepts the semantic feature values from routing function 503, which it uses to construct 2D feature maps. In addition, masking function 505 accepts the 2D location of the object of interest from controller 501 which, along with the 2D feature maps, allowing masking function 505 to compute an object mask for the object of interest. The object mask may be applied by pixel function 507 to eliminate most (if not all) extraneous pixels in the final image that are unrelated to the object of interest.

Figure 6A:
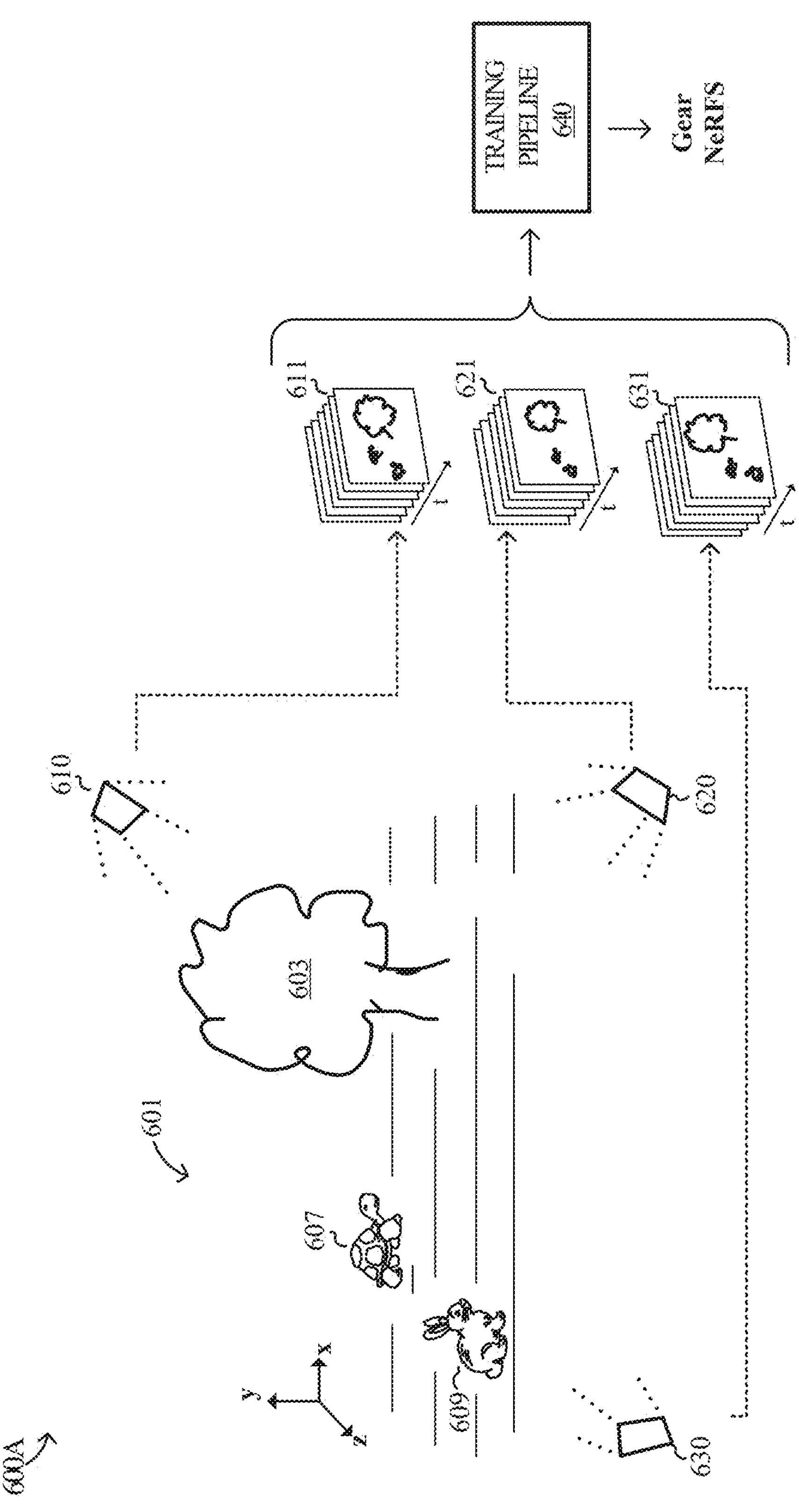

FIGS. 6A-6H further illustrate various aspects of the enhanced AI image processing technology disclosed herein. FIG. 6A illustrates a first stage (stage 600A) in an operational scenario that extends through to FIG. 6H. Stage 600A of the operational scenario involves a scene 601 captured over time in video by multiple cameras and from multiple viewing directions. Scene 601 includes multiple objects position in a 3D space represented by object 603 (a tree), object 607 (a turtle), and object 609 (a rabbit).

Camera 610 records scene 601 from a first direction in video frames 611, camera 620 records scene 601 from a second direction in video frames 621, and camera 630 records scene 601 from a third direction in video frames 631. It is assumed for exemplary purposes that each camera records the scene for approximately the same duration and in-sync with each other. Thus, each set of video frames is assumed to include the same number of frames in sync with each other with respect to their time stamps. The recorded video provides the 4D scene data supplied to training pipeline 640, which trains a set of NeRFs as described herein to construct novel images of scene 601 from desired viewpoints and at desired times.

Stage 600B in FIG. 6B illustrates motion that is assumed to occur in scene 601 for exemplary purposes. For example, between time t1 and time t2, object 607 moves left to right a distance of d1. However, over the same duration, object 609 has moved a much greater distance (d2). To provide further contrast, object 603 has exhibited little to no motion at all.

Stage 6C in FIG. 6C illustrates various motion regions in scene 601 that arise from the motion (or lack thereof) of objects 607, 609, and 603. The motion of object 603—since it is so low—is characterized along with the general background and thus falls into motion region 623. In contrast, the motion of object 607 creates motion region 627 through the scene, while the motion of object 609 creates motion region 629. Motion regions 627 and 629 are intended to visualize the four-dimensional nature of video, which consists of three spatial dimensions (x, y, and z) and a temporal dimension, t. A motion region can be conceptualized as a “tunnel” through a 3D scene, in a sense.

Figure 6D:
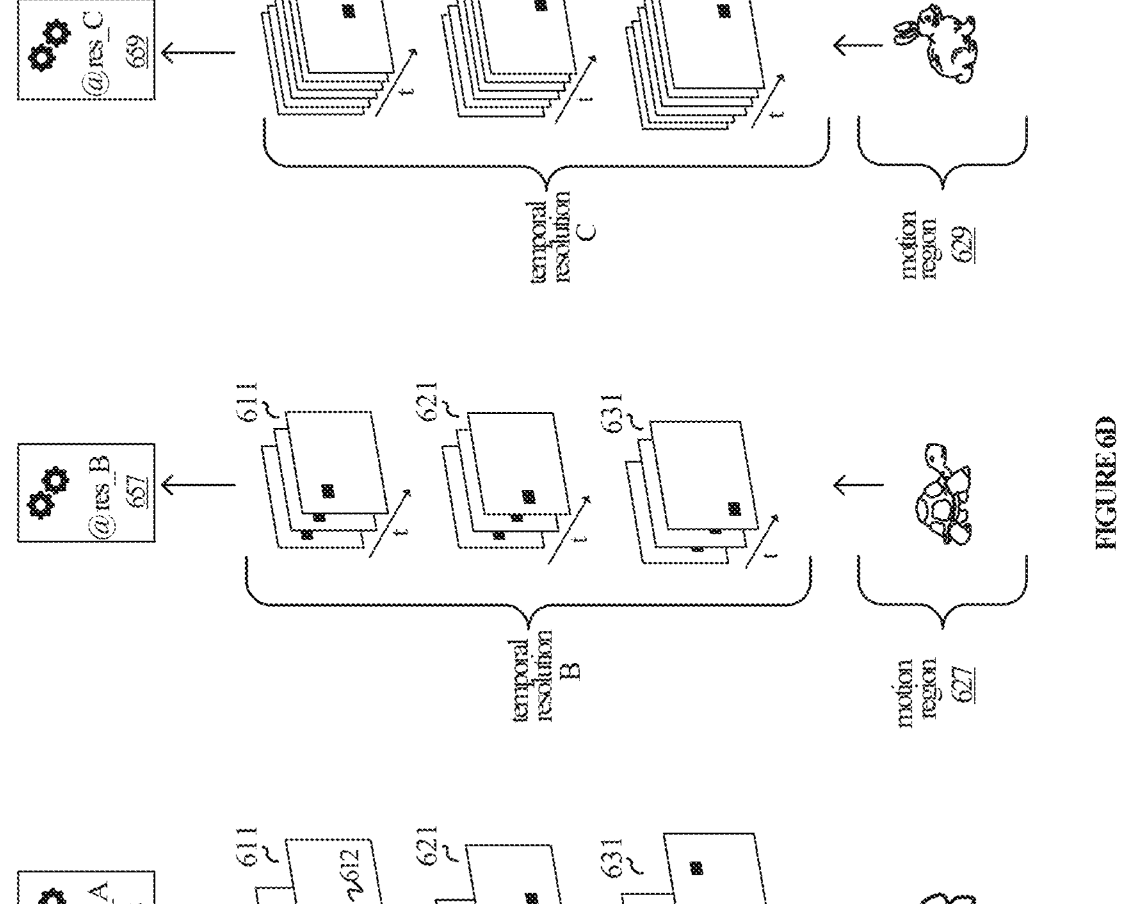
Figure 6E:
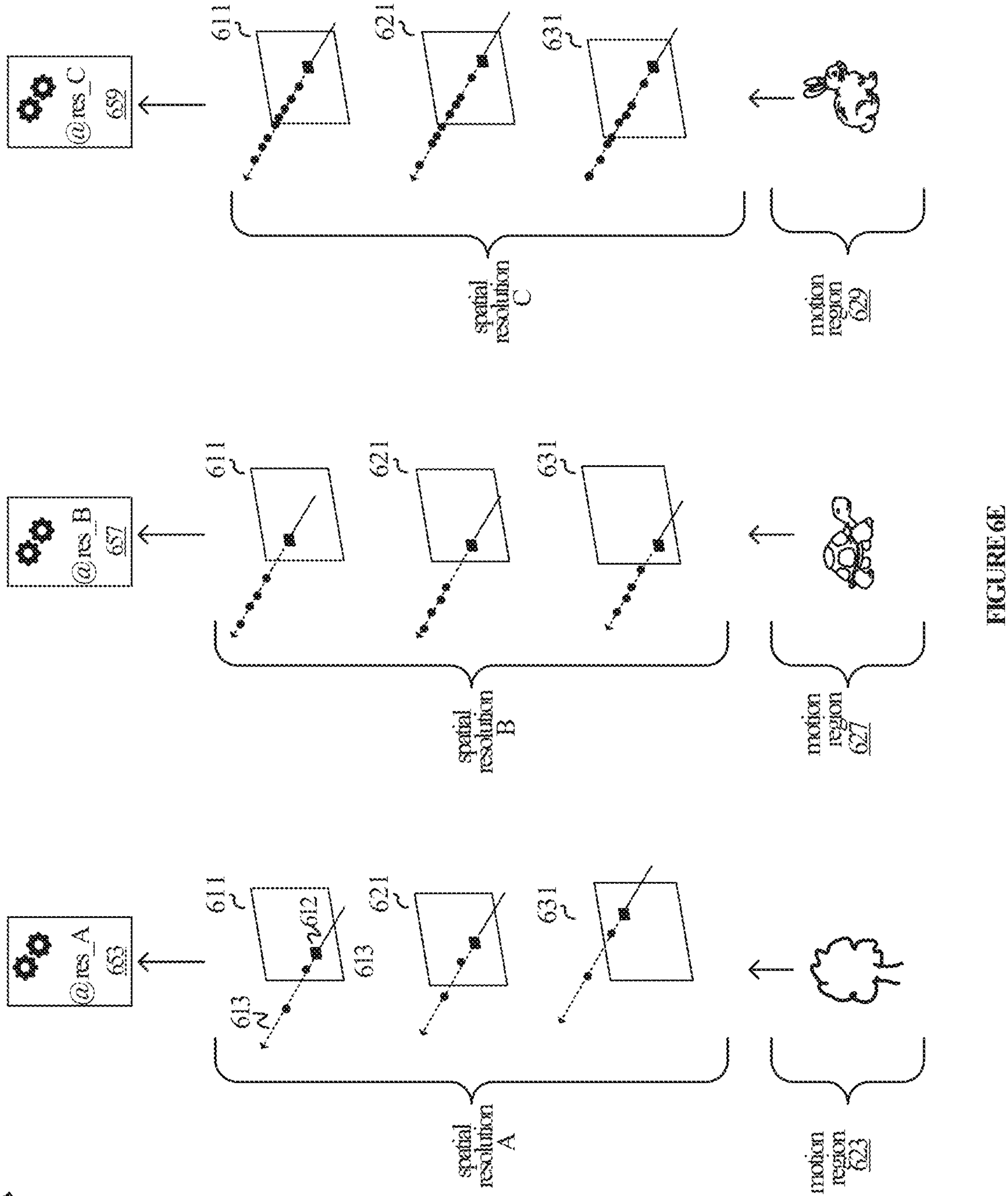

The various motion regions may be sampled at different spatio-temporal resolutions and supplied as input to different NeRFs. For example, a first NeRF within training pipeline 640 may be trained on motion region 623 at a first sampling resolution, while a second NeRF may be trained on motion region 627 at a sampling resolution greater than the first, and a third NeRF may be trained on motion region 629 at yet another sampling resolution that is greater than both the first sampling resolution and the second sampling resolution. (It may be appreciated that, while FIG. 6A-6H illustrate a 1:1 correspondence between motion regions and NeRFs/spatio-temporal sampling resolutions, a given NeRF may be trained on multiple motion regions at the designated spatio-temporal sampling resolution for that NeRF.) FIG. 6D illustrates in more detail the correspondence between motion regions and NeRFs.

In FIG. 6D, stage 600D of the operational scenario demonstrates the correspondence between motion regions and NeRFs, as well as the temporal component of the designated spatio-temporal sampling resolutions. In particular, stage 600D illustrates three NeRFs, represented by NeRF 653, NeRF 657, and NeRF 659. NeRF 653 is trained on motion region 623 at a first temporal sampling resolution (A), while NeRF 657 is trained on motion region 627 at a second temporal sampling resolution (B), and NeRF 659 is trained on motion region 629 at a third temporal sampling resolution.

It is assumed for illustrative purposes that temporal sampling resolution A is less than temporal sampling resolution B, which is less than temporal sampling resolution C. This is because motion region 623 includes the least amount of motion, while motion region 627 includes more motion than motion region 623, but less motion than motion region 629.

The difference in temporal sampling resolutions is represented by the variation in sampled pixels from each camera. For instance, with respect to NeRF 653 and temporal sampling resolution A, a pixel 612 in video frames 611 is sampled only twice. Translating the concept to 4D space, any sampled points corresponding to pixel 612 would only be drawn from points in time corresponding to the two frames shown here with respect to video frames 611. Similarly, a pixel in video frames 621 would only be sampled twice, as would another pixel in video frames 631. In 4D space, any sampled points corresponding to those pixels would only be drawn from points in time corresponding to the two frames shown here with respect to video frames 621 and 631.

In contrast, temporal sampling resolution B would cause pixels (or their related points in 4D) to be sampled more often. For example, with respect to NeRF 657 and temporal sampling resolution B, a pixel in video frames 611 would be sampled three times. Translating the concept to 4D space, any sampled points corresponding to that pixel would only be drawn from points in time corresponding to the three frames shown here with respect to video frames 611. Similarly, a pixel in video frames 621 would only be sampled three times, as would another pixel in video frames 631. In 4D space, any sampled points corresponding to those pixels would only be drawn from points in time corresponding to the three frames shown here with respect to video frames 621 and 631.

In further contrast, temporal sampling resolution C would cause pixels (or their related points in 4D) to be sampled more often than in both preceding examples. For example, with respect to NeRF 659 and temporal sampling resolution C, a pixel in video frames 611 would be sampled six times. Translating the concept to 4D space, any sampled points corresponding to that pixel would be drawn from points in time corresponding to the six frames shown here with respect to video frames 611. Similarly, a pixel in video frames 621 would only be sampled three times, as would another pixel in video frames 631. In 4D space, any sampled points corresponding to those pixels would only be drawn from points in time corresponding to the six frames shown here with respect to video frames 621 and 631.

Stage 600E in FIG. 6D illustrates the correspondence between motion regions and NeRFs, as well as the spatial component of the designated spatio-temporal sampling resolutions. Stage 600E also illustrates NeRF 653, NeRF 657, and NeRF 659 and their corresponding motion regions. NeRF 653 is trained on motion region 623 at a first spatial sampling resolution (A), while NeRF 657 is trained on motion region 627 at a second spatial sampling resolution (B), and NeRF 659 is trained on motion region 629 at a third spatial sampling resolution.

It is assumed for illustrative purposes that spatial sampling resolution A is less than spatial sampling resolution B, which is less than spatial sampling resolution C. This is again because motion region 623 includes the least amount of motion, while motion region 627 includes more motion than motion region 623, but less motion than motion region 629.

Holding the temporal component constant at a single instance of time, the difference in spatial sampling resolutions is represented by the variation in sampled voxels for a given pixel in a single frame. For instance, with respect to NeRF 653 and spatial sampling resolution A, the same pixel (pixel 612) in a single frame of video frames 611 is sampled only twice. Translating the concept to 4D space, only two points along a ray 613 projected from pixel 612 corresponding to pixel 612 would be sampled with respect to the single instance of time. However, combining the spatial sampling resolution in FIG. 6E with the temporal sampling resolution illustrated in FIG. 6D would result in four (4) total sampled points: the two points along the ray would each be sampled at the two instances of time specified by the temporal sampling resolution.

Similarly, a pixel at a single instance of video frames 621 would only be sampled twice spatially, as would another pixel in video frames 631. Translating the concept to 4D space, only two points along a ray projected from the pixel in video frames 621 would be sampled, and only two points along a ray projected from the pixel in video frames 631 would be sampled. Combining again the spatial sampling resolution in FIG. 6E with the temporal sampling resolution illustrated in FIG. 6D would result in four (4) total sampled points for each of video frames 621 and 623: the two points along each ray would each be sampled at the two instances of time specified by the temporal sampling resolution in FIG. 6D.

In contrast, spatial sampling resolution B would cause more points to be sampled than spatial sampling resolution A. Holding the temporal component constant at a single instance of time, the difference in spatial sampling resolutions is represented by the variation in sampled voxels for a given pixel in a single frame. For instance, with respect to NeRF 657 and . . . spatial sampling resolution B, a pixel at the single instance of time in video frames 611 is sampled four times. Translating the concept to 4D space, four points along a ray projected from the pixel would be sampled with respect to the single instance of time. Combining the spatial sampling resolution in FIG. 6E with the temporal sampling resolution illustrated in FIG. 6D would result in twelve (12) total sampled points: the four points along the ray would each be sampled at the three instances of time specified by the temporal sampling resolution.

Similarly, a pixel at a single instance of video frames 621 would be sampled four times spatially, as would another pixel in video frames 631. Translating the concept to 4D space, four points along a ray projected from the pixel in video frames 621 would be sampled, and four points along a ray projected from the pixel in video frames 631 would be sampled. Combining again the spatial sampling resolution in FIG. 6E with the temporal sampling resolution illustrated in FIG. 6D would result in twelve (12) total sampled points for each of the video frames 621 and 631: the four points along each ray would each be sampled at the three instances of time specified by the temporal sampling resolution in FIG. 6D.

In further contrast, spatial sampling resolution C would cause even more points to be sampled than either spatial sampling resolution A or B. Holding the temporal component constant at a single instance of time, the difference in spatial sampling resolutions is represented by the variation in sampled voxels for a given pixel in a single frame. For instance, with respect to NeRF 659 and spatial sampling resolution C, a pixel at the single instance of time in video frames 611 is sampled eight times. Translating the concept to 4D space, eight points along a ray projected from the pixel would be sampled with respect to the single instance of time. Combining the spatial sampling resolution in FIG. 6E with the temporal sampling resolution illustrated in FIG. 6D would result in forty-eight (48) total sampled points: the eight points along the ray would each be sampled at the six instances of time specified by the temporal sampling resolution.

Similarly, a pixel at a single instance of the video frames 621 would be sampled eight times spatially, as would another pixel in video frames 631. Translating the concept to 4D space, eight points along a ray projected from the pixel in video frames 621 would be sampled, and eight points along a ray projected from the pixel in video frames 631 would be sampled. Combining again the spatial sampling resolution in FIG. 6E with the temporal sampling resolution illustrated in FIG. 6D would result in forty-eight (48) total sampled points for each of the video frames 621 and 631: the eight points along each ray would each be sampled at the six instances of time specified by the temporal sampling resolution in FIG. 6D.

FIG. 6F illustrates stage 600F in the operational scenario. Here, a user desires to view scene 601 from a desired viewpoint at a desired time. The user may enter the viewing parameters via a user interface, which are fed to rendering pipeline 690. Desired view 681 which represents the perspective that would be captured by a fictious camera 680 oriented at a fictious direction suitable for rendering a 2D image in accordance with the user's selections. Note that the position and direction of fictitious camera 680 is novel with respect to the placement of any of cameras 610, 620, and 630 in FIG. 6A. Rendering pipeline 690 accepts the viewing parameters and produces a rendered image in accordance with the operational flows discussed above with respect to rendering pipeline 105 and 500.

Figure 6G:
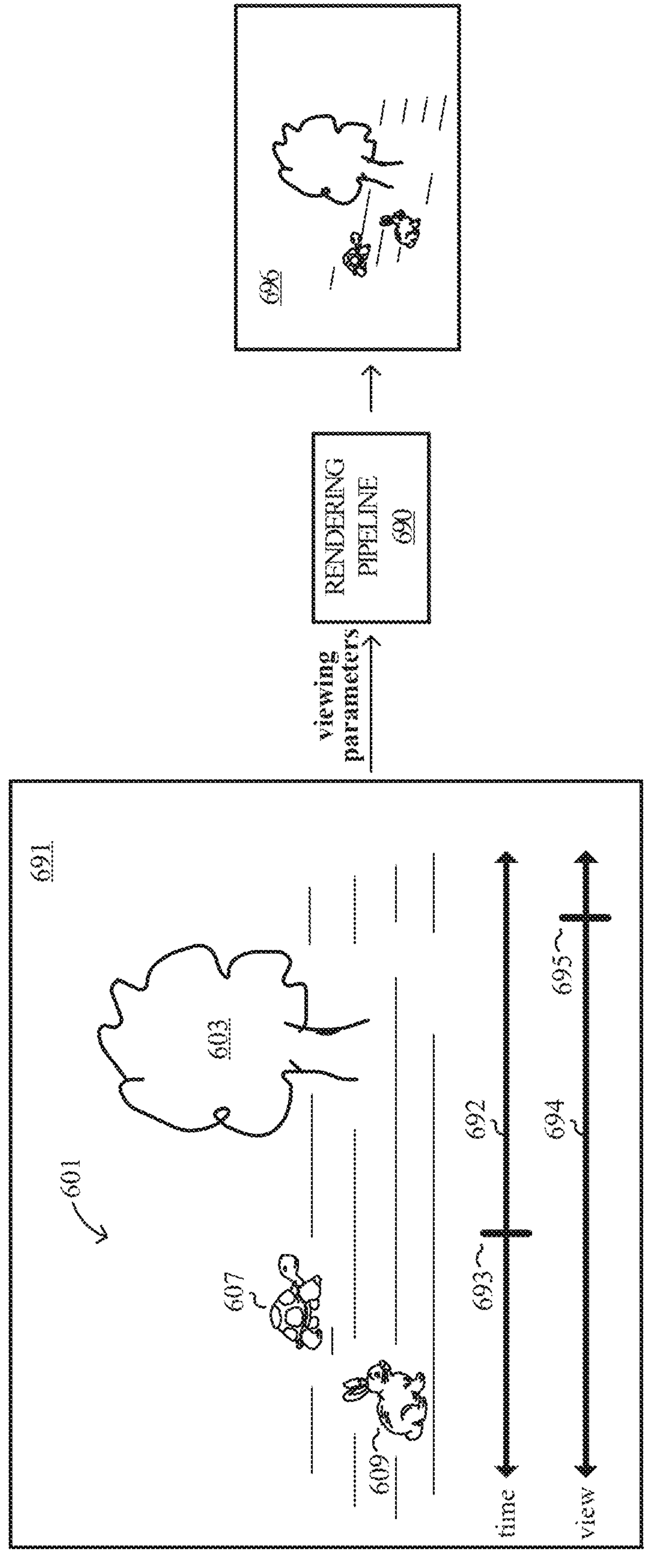

FIG. 6G illustrates stage 600G in the operational scenario. Stage 600H involves a user interface 691 via which a user may view an initial 2D image of scene 601, as well as input viewing parameters. User interface 691 includes a time bar 692 using which the user may adjust a slider 693 to specify a desired instance of time. User interface 691 also includes a viewing direction bar 694 using which the user may adjust a slider 694 to specify a desired viewing direction. Rendering pipeline 690 takes the viewing parameters as input and produces a 2D image 696 from the perspective of the desired viewing direction and desired time. Note that 2D image 696 appears at least slightly different (or novel) with respect to any of the images or frames captured by cameras 610, 620, and 630.

Figure 6H:
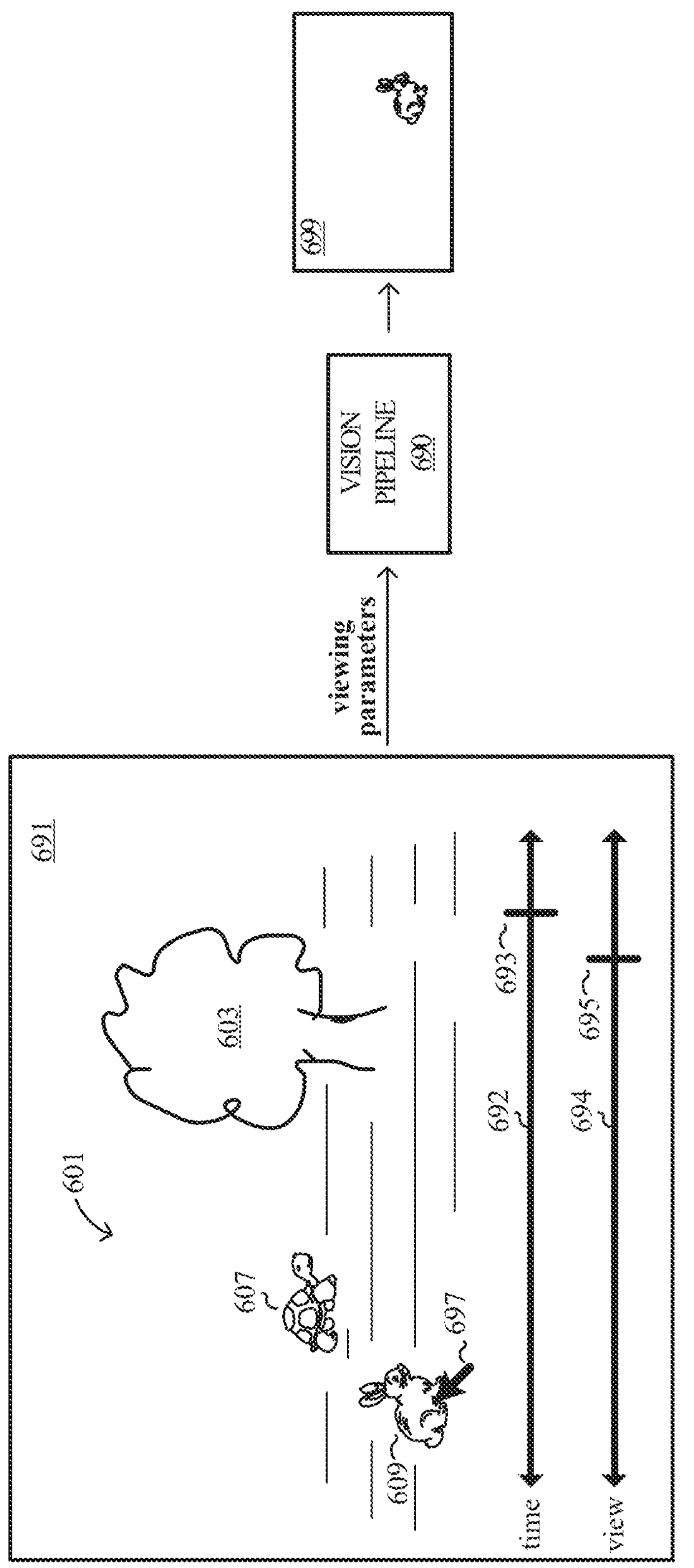

Lastly, FIG. 6H illustrates an optional stage in the operational scenario. Stage 600H illustrates the same user interface 691 as in FIG. 6G, with the addition of an object selection 697. Object selection 697 serves to identify an object of interest to rendering pipeline 690. Accordingly, rendering pipeline 690 is able to filter out most or all other pixels from 2D image 696 unrelated to the object of interest. The resulting 2D image 699 includes only those pixels associated with the object of interest. Note again that, in addition to its object tracking feature, 2D image 699 appears at least slightly different (or novel) with respect to any of the images or frames captured by cameras 610, 620, and 630.

Framework: Gear-NeRF

The following sections describe in more detail a framework for implementing the concepts discussed above. The framework may be implemented in program instructions in the context of software and/or firmware elements. The program instructions, when executed by one or more processing devices of one or more computing systems, direct the one or more computing systems to operate as described below with respect to the framework.

Neural Radiance Fields (NeRFs):

Vanilla NeRFs employ a multi-layer perceptron (MLP) with sinusoidal positional encoding to map a 3D-spatial coordinate x=(x, y, z) and a viewing direction d=(θ, ϕ) to a volume density $\sigma \in [0,1]$ and an emitted RGB, $c \in \mathbb{R}^3$. Rendering each image pixel involves casting a ray r(t)=o+td from the camera center o through the pixel along direction d. The predicted color for the corresponding pixel is computed as:

$$\hat{C}(r) = \sum_{i=1}^{N} T_i \alpha_i c_i, \tag{1}$$

where $$T_i = \exp\left(-\sum_{j=1}^{i-1} \sigma_j \delta_j\right), \alpha_i = 1 - \exp(-\sigma_i \delta_i), \text{ and } \delta_j = t_{j+1} - t_j.$$

A vanilla NeRF is trained by minimizing the mean squared error between the input images and the predicted images, obtained by rendering the scene from the viewpoints from which the input images have been captured, with the training loss given by:

$$\mathcal{L}_{pho} = \sum_{r \in \mathcal{R}} \left\| \hat{C}(r) - C(r) \right\|_2^2. \tag{2}$$

where $\mathcal{R}$ is the set of all rays projected from the input image.

Planar-Factorized 4D Volumes:

A recent emerging trend of handling dynamics using radiance field representations is to directly adapt them to be conditioned on a frame index t in addition to x and d. This can be accomplished by learning a mapping from (x, d, t) to (σ, c) using planar-factorized 4D volumes. These methods attempt to learn a 4D feature vectors for every (x, t), by projecting it to a set of 2D-planes. Embeddings of these projections on these planes can then be integrated to obtain the embedding for the 4D point. This can be mathematically represented as follows:

$$f(x, t) = B_1(h_1(x, y) \odot k_1(z, t)) + B_2(h_2(x, z) \odot k_2(y, t)) + B_3(h_3(y, z) \odot k_3(x, t)). \tag{3}$$

where $h_i(\bullet,\bullet)$ and $k_i(\bullet,\bullet)$ are functions (evaluated by bilinear interpolation on regular spaced 2D feature grids) embedding coordinate tuples to features of dimension m, "⊙" denotes an element-wise product, and $B_i(\bullet)$ denotes a linear transform which maps the products to feature vectors. Subsequently, a tiny MLP can map the feature vector $f(\bullet,\bullet)$ to the volume density, σ, and the view-dependent emitted color, c, given the viewing direction d.

Proposed Method

Given a set of W input videos, $\mathcal{V} = \{V_1, V_2, \ldots, V_W\}$ of a dynamic scene, with calibrated camera poses, the disclosed framework-referred to herein as Gear-NeRF—represents the scene using a series of 4D feature volumes along with 4D semantic embeddings.

Analogous to multiple gears in motor vehicles for optimizing engine performance, Gear-NeRF stratifies this semantically embedded scene representation into $N_{gear}$ levels, based on the motion scales. Each of these levels is called a gear. Through an enhanced training scheme, regions with larger motion are assigned higher gear levels and as a result, receive denser spatio-temporal sampling for improved dynamic novel view synthesis. The proposed 4D semantic embedding also enables a new functionality, almost for free-free-viewpoint tracking of target objects, given simple user prompts like clicks.

Figure 7:
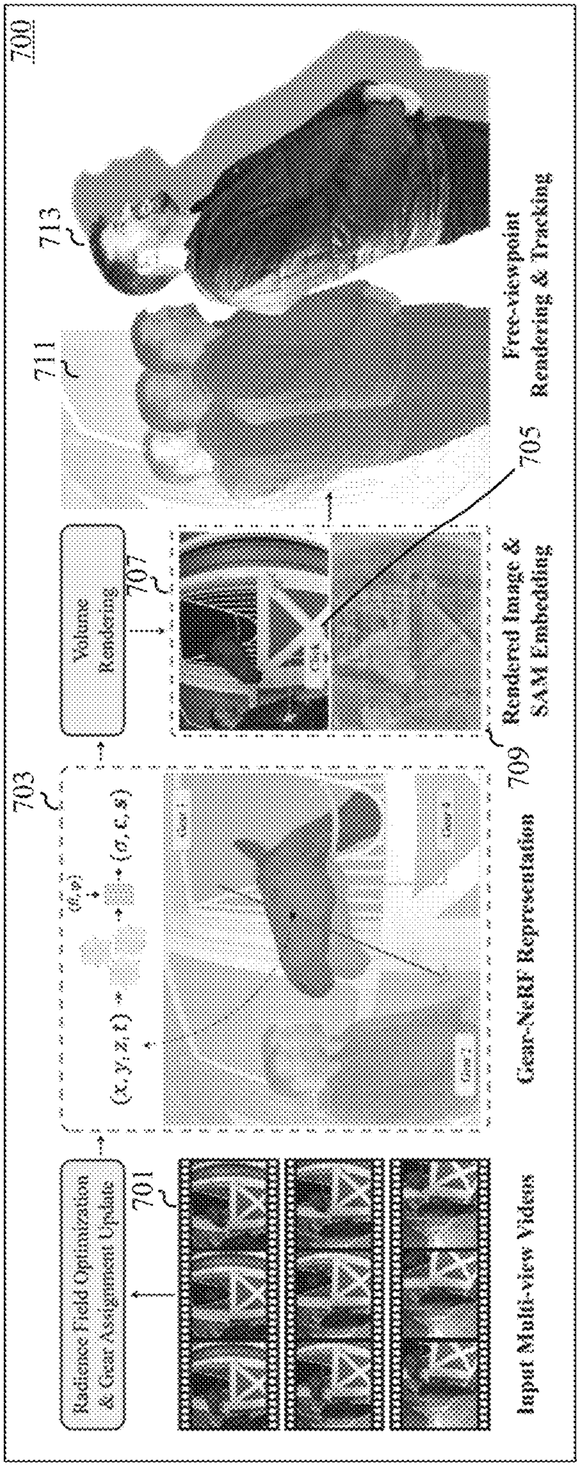
FIG. 7 illustrates an operational framework in an implementation.

FIG. 7 shows the overall pipeline 700 of Gear-NeRF. In FIG. 7, Gear-NeRF 703 takes multi-view videos 701 as input. After optimizing the serial 4D feature volumes, Gear-NeRF 703 maps space-time coordinates to a 4D semantic embedding, in addition to the volume density and view-dependent radiance color. Gear-NeRF 703 allows for volume rendering of a desired 2D RGB output image 707, as well as a 2D feature map 709. Regions with larger motion 711 are automatically assigned higher gear levels and as a result, receive higher-resolution spatio-temporal sampling. Furthermore, Gear-NeRF is capable of performing free-viewpoint tracking of a target object 713 with prompts as simple as a user click 705.

Serial 4D Feature Volumes

Instead of using a unified 4D volume to represent a dynamic scene, the framework's representation includes of a series of feature volumes, each corresponding to a gear level, $\mathcal{G}$. Specifically, for any space-time coordinate (x, t), its feature vector corresponding to $\mathcal{G}$ is computed as follows:

$$f^{\mathcal{G}}(x, t) = B_1\big(h_1(x, y) \odot k_1^{\mathcal{G}}(z, t)\big) + B_2\big(h_2(x, z) \odot k_2^{\mathcal{G}}(y, t)\big) + B_3\big(h_3(y, z) \odot k_3^{\mathcal{G}}(x, t)\big). \tag{4}$$

The vector-valued functions $h_j(\cdot,\cdot)$ and linear transforms $B_j(\cdot)$ are shared by all gears, while each gear has its own spatio-temporal embedding $\mathbf{k}_j^{\mathcal{G}}(\cdot,\cdot)$. Therefore, each gear describes regions of a certain scale of motion while the purely spatial features can be shared among all gears.

The framework obtains the gear level at any spatio-temporal coordinate also from a planar-factorized 4D feature volume. Specifically, the gear level at (x, t) is computed as:

$$g(x, t) = 1^{\top}(h_1'(x, y) \odot k_1'(z, t)) + 1^{\top}(h_2'(x, z) \odot k_2'(y, t)) + 1^{\top}(h_3'(y, z) \odot k_3'(x, t)), \tag{5}$$

where 1 is a vector of ones, $h'_i(\cdot,\cdot)$ and $k'_i(\cdot,\cdot)$ are embedding functions. This however defines a continuous feature volume. To map it to the gear level integers, we apply the following projection operation:

$$p(x, t) = \begin{cases} 1, & \text{if } g(x, t) < 1, \\ N_{gear}, & \text{if } g(x, t) \geq N_{gear}, \\ \lceil g(x, t) \rceil, & \text{otherwise.} \end{cases} \tag{6}$$

Based on this gear level volume, we define a 4D mask for a region at gear level $\mathcal{G}$ as:

$$m_{\mathcal{G}}(x, t) = \begin{cases} 1, & \text{if } p(x, t) = \mathcal{G}, \\ 0, & \text{otherwise.} \end{cases} \tag{7}$$

The final feature vector at (x, t) is computed as:

$$f(x, t) = \sum_{\mathcal{G}=1}^{N_{gear}} m_{\mathcal{G}}(x, t) f^{\mathcal{G}}(x, t). \tag{8}$$

Subsequently, a tiny MLP, $F_\Theta$, maps these feature vectors $f(\cdot,\cdot)$ as well as the viewing direction d to the volume density σ and radiance/color value c. This allows the framework to obtain a photometric rendering of the scene.

4D Semantic Embedding

Gear-NeRF leverages the strong object priors of the Segment Anything Model (SAM) model to acquire a semantic understanding of the scene, for improved photometric rendering as well as free-viewpoint object tracking. Toward this end, the framework utilizes the SAM encoder to obtain 2D feature maps from the frames of each video. The framework then optimizes a 4D SAM embedding field by supervising it with these 2D feature maps. In particular, the MLP above, Fe, is configured to output a 4D semantic embedding s for a given space-time coordinate in addition to the density and color. To render 2D semantic feature maps in a given view, the framework computes the semantic feature of a pixel in the feature map by tracing a ray through it and performing volume rendering, analogous to Equation 1:

$$\hat{S}(r) = \sum_{i=1}^{N} T_i \alpha_i s_i. \tag{9}$$

This SAM embedding is supervised by minimizing the mean squared error between the prediction and the ground truth features (S(r)) from the SAM encoder, as shown below:

$$\mathcal{L}_{SAM} = \sum_{r \in \mathcal{R}} \|\hat{S}(r) - S(r)\|_2^2. \tag{10}$$

Training Scheme with Gear Assignment

With gear initialization g(x, t)=1, ∀x, t, the (semantically embedded) radiance field optimization and gear assignment updating take place in an alternating fashion.

Gear Assignment Update: When updating gear assignment after a period of radiance field optimization, the framework finds the regions that are rendered most poorly from the rendering loss maps and increments their gears for denser spatio-temporal sampling. The following steps lay out the process for updating gear assignments to regions:

The framework samples a number of viewpoints and time steps and renders 2D-images/SAM features for it. For every rendered RGB-SAM map, the framework computes a rendering loss map. Each pixel of the rendering loss map is computed using $\mathcal{L}(r) := \mathcal{L}_{pho}(r) + \lambda \mathcal{L}_{SAM}(r)$.

The framework then patchifies each rendering loss map to find patches with top-k largest/smallest average loss. The center coordinate of these patches serve as positive/negative prompts for the next step.

The framework feeds the ground truth RGB image together with the positive and negative prompts into the SAM decoder to estimate an upshift mask. These masks tend to cover regions that have motions and are not satisfactorily rendered with the current sampling resolution. Note that there are multiple upshift masks at different viewpoints and time step.

For every pixel of an upshift mask, the framework traces a ray and samples points along it and updates the gear assignment by pushing g (x, t) towards incremented values.

With the updated gear assignment, the framework increases the resolution of spatio-temporal sampling for the gear-shifted regions and then resumes the task of optimizing the radiance field.

The framework alternates between two processes: radiance field optimization (each time for L epochs), and gear assignment updates until the average variance of each rendering loss map is below a predetermined threshold. After this, the framework optimizes the radiance field for an additional L' epochs without further gear assignment updates.

Motion-Aware Spatio-Temporal Sampling

This subsection explains the framework's motion-aware spatio-temporal sampling strategy based on assigned gears, permitting differential processing of regions at different gear levels. Temporal sampling implies the choice of temporal resolution for planar-factorized 4D feature volumes, and by spatial sampling, the strategy used to choose sampling points along each ray for volume rendering.

Motion-aware Temporal Sampling: To handle the increasing intensity of object motion, as reflected by their growing gear levels, the framework increments the temporal resolution for voxel grids. Specifically, $\mathbf{k}_j^{\mathcal{G}}$ in Equation 4 has increasing resolution along the time axis, thereby empowering the 4D feature volumes to better model the dynamics along the temporal axis. This ensures fast-moving objects can be more faithfully modeled without unsightly blurring. The temporal resolution for each gear's feature volume is determined by linear interpolation between 1 (for $\mathcal{G}=1$) and the total number of frames (for $\mathcal{G}=N_{gear}$).

Motion-aware Spatial Sampling: While denser sampling of points can improve reconstruction accuracy, increasing the number of sampling points throughout the scene can lead to prohibitive computational costs. Therefore, the framework employs a 3D point-splitting strategy. The framework beings the point splitting strategy by sampling a relatively small number, n, of samples along each ray, assuming it is at the lowest gear level. If a sampled point belongs to a region with a higher gear, as determined by p (x, t), then the framework samples, points, more densely in that region. For every sampled point in that region, the framework splits it into $2^{p(x,t)}$ points, equally spaced within the corresponding ray segment (at that gear level).

Free-Viewpoint Tracking with User Prompts

The proposed 4D SAM embedding is conducive to high-quality promptable mask segmentation and enables another useful functionality, almost for free—free-viewpoint object tracking, where the user only needs to provide as few as one click to extract the target object based on the 4D embedding. Described next is how, given a user-supplied point click at any arbitrary viewpoint and time step, the framework obtains the corresponding object mask at a novel viewpoint and time step.

Masks for Novel Viewpoints: The first step for this task entails finding the 3D correspondence of the user click. To accomplish this, the framework traces a ray through the selected pixel, and by utilizing the volume density, determines the depth at which the ray intersects with the first object surface it encounters. This yields the 3D coordinates of the intersection point. Subsequently, the 3D coordinates of this intersection can be easily mapped into a 2D coordinate within any novel viewpoint image, using the camera pose of the new viewpoint. Alongside the rendered SAM feature map of the novel view, the framework feeds this coordinate into the SAM decoder to generate the object mask for the novel view.

Masks for Novel Time Steps: For this task, the framework propagates an object mask to its neighboring time step. Specifically, with an object mask for a specific frame t, the framework calculates the bounding box of this mask and uses this bounding box as a prompt to SAM for neighboring frames t'=t+1 or t−1. By inputting this prompt along with the rendered SAM feature map at t' into the SAM decoder, we can obtain the object mask for t'.

Combining the above two processes, we can start from a single click and get the object mask in any viewpoint and time step.

FIG. 8 illustrates computing device 801 that is representative of any system or collection of systems in which the various processes, programs, services, frameworks, and scenarios disclosed herein may be implemented. Examples of computing device 801 include, but are not limited to, desktop and laptop computers, tablet computers, mobile computers, server computers, web servers, cloud computing platforms, and data center equipment, as well as any other type of physical or virtual server machine, container, and any variation or combination thereof.

Computing device 801 may be implemented as a single apparatus, system, or device or may be implemented in a distributed manner as multiple apparatuses, systems, or devices. Computing device 801 includes, but is not limited to, processing system 802, storage system 803, software 805, communication interface system 807, and user interface system 809. Processing system 802 is operatively coupled with storage system 803, communication interface system 807, and user interface system 809. Computing device 801 may optionally include additional devices, features, or functionality not discussed for purposes of brevity.

Processing system 802 loads and executes software 805 from storage system 803. Software 805 includes and implements computer vision process 806, which is representative of training process 200 and rendering process 300. When executed by processing system 802, software 805 directs processing system 802 to operate as described herein for at least the various processes, operational scenarios, and sequences discussed in the foregoing implementations.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, digital signal processors, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including computer vision process 806) may be implemented in program instructions and among other functions may, when executed by processing system 802, direct processing system 802 to operate as described with respect to the various operational scenarios, sequences, frameworks, and processes illustrated and/or discussed herein. For example, software 805 may include program instructions for implementing the sampling, training, and/or rendering processes described herein, as well as the execution of multiple NeRFs as discussed herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded or multi-threaded environment, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing device 801 is representative) overall from a general-purpose computing system into a special-purpose computing system customized to perform computer vision processes in an optimized manner. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. An artificial intelligence (AI) image processing system employing multiple dynamic neural radiance fields (NeRFs) to render two-dimensional (2D) images of a four-dimensional (4D) scene from different viewpoints and different instances of time, the AI image processing system comprising:

at least one processor and a memory having instructions stored thereon that cause the at least one processor of the AI image processing system to:

collect viewing parameters for rendering a two-dimensional (2D) image of the 4D scene, wherein the viewing parameters comprise a desired viewing direction and a desired instance of time, and wherein the 4D scene comprises a three-dimensional (3D) scene that changes over time;

selectively execute the multiple dynamic NeRFs based on 4D coordinates of voxels associated with pixels in the 2D image to obtain, based on the viewing parameters, color and volume density values for the voxels associated with pixels in the 2D image, wherein the multiple dynamic NeRFs comprise implicit neural representations of the 4D scene, and wherein each of the multiple dynamic NeRFs has a different spatio-temporal resolution with respect to each other of the multiple dynamic NeRFs; and render the 2D image based on a combination of the color and the volume density values obtained from the multiple dynamic NeRFs.

2. The AI image processing system of claim 1 wherein the viewing parameters further comprise an object of interest from the 4D scene, and wherein the instructions further cause the at least one processor to:

execute one or more of the multiple dynamic NeRFs to obtain a feature map of the 2D image;

obtain, based at least in part on the feature map, an object mask corresponding to the object of interest; and apply the object mask to the 2D image.

3. The AI image processing system of claim 2 further comprising an input interface configured to receive selections of the viewing parameters, wherein the selections include a selection of the object of interest from a different 2D image corresponding to a different instance of time than the desired instance of time.

4. The AI image processing system of claim 3 wherein, to obtain the object mask based at least in part on the feature map, the instructions cause the at least one processor to:

determine a location of the object of interest in the different 2D image;

determine a location of the object of interest in the 3D scene based at least on the location of the object of interest in the different 2D image;

determine a location of the object of interest in the 2D image based on the location of the object of interest in the 3D scene; and generate the object mask based on the location of the object of interest in the 2D image.

5. The AI image processing system of claim 1 wherein, to selectively execute the multiple dynamic NeRFs to obtain the color and volume density values for the voxels associated with the pixels in the 2D image, the instructions cause the at least one processor to, for each pixel in the 2D image:

identify a group of voxels associated with the pixel, wherein each of the group of voxels is associated with a different four-dimensional (4D) space-time coordinate; and for each voxel in the group of voxels:

select a one of the NeRFs to execute based on a 4D space-time coordinate associated with the voxel; and execute the one of the NeRFs to obtain a color value and a volume density value for the voxel.

6. The AI image processing system of claim 1 wherein, to selectively execute the multiple dynamic NeRFs to obtain the color and volume density values for the voxels associated with the pixels in the 2D image, the instructions cause the at least one processor to, for each voxel associated with each pixel in the 2D image, execute only one of the multiple dynamic NeRFs to obtain a color value and a volume density value for the voxel.

7. The AI image processing system of claim 1 wherein, to selectively execute the multiple dynamic NeRFs to obtain the color and volume density values for the voxels associated with the pixels in the 2D image, the instructions cause the at least one processor to, for each voxel associated with each pixel in the 2D image, execute all of the multiple dynamic NeRFs to obtain a color value and a volume density value for the voxel.

8. The AI image processing system of claim 1 wherein the multiple dynamic NeRFs correspond to different motion regions of the 4D scene and wherein the instructions further cause the at least one processor to train each of the multiple dynamic NeRFs to a spatio-temporal resolution associated with a corresponding one of the different motion regions.

9. The AI image processing system of claim 8 wherein each of the multiple dynamic NeRFs comprises an implicit neural representation of a portion of the 4D scene that differs relative to the portion of the 4D scene implicitly represented by each other of the multiple dynamic NeRFs.

10. The AI image processing system of claim 1 wherein the multiple dynamic NeRFs include a first dynamic NeRF corresponding to a first moving object in the 4D scene, and a second dynamic NeRF corresponding to a second moving object in the 4D scene, wherein a motion of the first moving object is greater than a motion of the second moving object, and wherein a spatio-temporal resolution of the first dynamic NeRF is greater than a spatio-temporal resolution of the second dynamic NeRF.

11. A method for rendering images of a four-dimensional (4D) scene from different viewpoints at different instances in time using multiple dynamic Neural Radiance Fields (NeRFs), the method comprising:

collecting viewing parameters for rendering a two-dimensional (2D) image of the 4D scene, wherein the viewing parameters comprise a desired viewing direction and a desired instance of time, and wherein the 4D scene comprises a three-dimensional (3D) scene that changes over time;

selectively executing the multiple dynamic NeRFs based on 4D coordinates of voxels associated with pixels in the 2D image to obtain, based on the viewing parameters, color and volume density values for the voxels associated with pixels in the 2D image, wherein the multiple dynamic NeRFs comprise implicit neural representations of the 4D scene, and wherein each of the multiple dynamic NeRFs has a different spatio-temporal resolution with respect to each other of the multiple dynamic NeRFs; and rendering the 2D image based on a combination of the color and the volume density values obtained from the multiple dynamic NeRFs.

12. The method of claim 11 wherein the viewing parameters further comprise an object of interest from the 4D scene, and wherein the method further comprises:

executing one or more of the multiple dynamic NeRFs to obtain a feature map of the 2D image;

obtaining, based at least in part on the feature map, an object mask corresponding to the object of interest; and applying the object mask to the 2D image.

13. The method of claim 12 further comprising receiving, via a user interface, selections of the viewing parameters, wherein the selections include a selection of the object of interest from a different 2D image corresponding to a different instance of time than the desired instance of time.

14. The method of claim 13 wherein, obtaining the object mask based at least in part on the feature map comprises:

determining a location of the object of interest in the different 2D image;

determining a location of the object of interest in the 3D scene based at least on the location of the object of interest in the different 2D image;

determining a location of the object of interest in the 2D image based on the location of the object of interest in the 3D scene; and generating the object mask based on the location of the object of interest in the 2D image.

15. The method of claim 11 wherein selectively executing the multiple dynamic NeRFs to obtain the color and volume density values for the voxels associated with the pixels in the 2D image comprises, for each pixel in the 2D image:

identifying a group of voxels associated with the pixel, wherein each of the group of voxels is associated with a different four-dimensional (4D) space-time coordinate; and for each voxel in the group of voxels:

selecting a one of the multiple dynamic NeRFs to execute based on a 4D space-time coordinate associated with the voxel; and executing the one of the multiple dynamic NeRFs to obtain a color value and a volume density value for the voxel.

16. The method of claim 11 wherein executing the multiple dynamic NeRFs to obtain the color and volume density values for the voxels associated with the pixels in the 2D image comprises, for each voxel associated with each pixel in the 2D image, executing only one of the multiple dynamic NeRFs to obtain a color value and a volume density value for the voxel.

17. The method of claim 11 wherein executing the multiple dynamic NeRFs to obtain the color and volume density values for the voxels associated with the pixels in the 2D image comprises, for each voxel associated with each pixel in the 2D image, executing all of the multiple dynamic NeRFs to obtain a color value and a volume density value for the voxel.

18. The method of claim 11 wherein each of the multiple dynamic NeRFs comprises an implicit neural representation of a portion of the 4D scene that differs relative to the portion of the 4D scene implicitly represented by each other of the multiple dynamic NeRFs.

19. The method of claim 11 further comprising training the multiple dynamic NeRFs at different spatio-temporal sampling resolutions relative to each other, and on different portions of the 4D scene relative to each other, wherein each portion of the 4D scene on which each of the multiple dynamic NeRFs is trained has a motion intensity that differs relative to the motion intensity of each other portion of the 4D scene on which each other of the multiple dynamic NeRFs is trained.

20. A computing apparatus comprising:

one or more computer readable storage media having program instructions stored thereon that, when read and executed by one or more processors, direct the computing apparatus to at least:

selectively execute multiple dynamic NeRFs based on 4D coordinates of voxels associated with pixels in a 2D image to obtain, based on viewing parameters comprising a desired viewing direction and a desired instance of time, color and volume density values for the voxels, wherein the multiple dynamic NeRFs comprise implicit neural representations of a 4D scene trained to different spatio-temporal resolutions;

render the 2D image based on a combination of the color and the volume density values obtained from the multiple dynamic NeRFs;

execute one or more of the multiple dynamic NeRFs to obtain a feature map of the 2D image;

generate, based at least in part on the feature map, an object mask corresponding to an object of interest in the 4D scene; and apply the object mask to the 2D image.

* * * * *